United States Patent
Ratti et al.

(10) Patent No.: US 11,706,392 B2
(45) Date of Patent: Jul. 18, 2023

(54) MEMS RESONANCE CONTROL USING PHASE DETECTION

(71) Applicants: STMicroelectronics LTD, Netanya (IL); STMicroelectronics S.r.l., Agrate Brianza (IT)

(72) Inventors: Massimo Ratti, Bernareggio (IT); Eli Yaser, Tel Aviv (IL); Naomi Petrushevsky, Yavne (IL); Yotam Nachmias, Tel Aviv (IL)

(73) Assignees: STMicroelectronics LTD, Netanya (IL); STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/479,176

(22) Filed: Sep. 20, 2021

(65) Prior Publication Data

US 2022/0006988 A1    Jan. 6, 2022

Related U.S. Application Data

(60) Division of application No. 17/012,938, filed on Sep. 4, 2020, now Pat. No. 11,553,164, which is a continuation of application No. 16/585,751, filed on Sep. 27, 2019, now Pat. No. 10,805,583, which is a continuation of application No. 16/032,634, filed on Jul. 11, 2018, now Pat. No. 10,469,813, which is a continuation-in-part of application No. 15/850,667, filed on Dec. 21, 2017, now Pat. No. 10,288,990.

(51) Int. Cl.
*H04N 9/31* (2006.01)
*G06T 1/20* (2006.01)

(52) U.S. Cl.
CPC ............ *H04N 9/3182* (2013.01); *G06T 1/20* (2013.01); *H04N 9/3135* (2013.01)

(58) Field of Classification Search
CPC ...... H04N 9/3182; H04N 9/3135; G06T 1/20; G02B 27/017; G02B 26/0833; G02B 26/0858; G02B 26/101
See application file for complete search history.

(56) References Cited

U.S. PATENT DOCUMENTS

| | | | |
|---|---|---|---|
| 10,469,813 B2 | 11/2019 | Ratti et al. | |
| 10,805,583 B2 | 10/2020 | Ratti et al. | |
| 10,840,922 B1 | 11/2020 | Stelzer et al. | |
| 2007/0146346 A1 | 6/2007 | Sata et al. | |
| 2009/0116091 A1 | 5/2009 | Overmann et al. | |

(Continued)

*Primary Examiner* — Michael Lee
(74) *Attorney, Agent, or Firm* — Crowe & Dunlevy

(57) ABSTRACT

A light projection system includes a MEMS mirror operating on a mirror drive signal to generate a mirror sense signal resulting from operation of the MEMS mirror based on the mirror drive signal. A mirror driver generates the mirror drive signal from a drive control signal. A controller receives the mirror sense signal from the MEMS mirror, obtains a first sample of the mirror sense signal at a first phase thereof, obtains a second sample of the mirror sense signal at a second phase thereof, wherein the first and second phases are separated by a half period of the mirror drive signal, with the second phase occurring after the first phase, and generates the drive control signal based on a difference between the first and second samples to keep the mirror drive signal separated in phase from the mirror sense signal by a desired amount of phase separation.

30 Claims, 22 Drawing Sheets

(56) References Cited

U.S. PATENT DOCUMENTS

| | | |
|---|---|---|
| 2009/0224136 A1 | 9/2009 | Ikegami |
| 2009/0244389 A1 | 10/2009 | Mishima et al. |
| 2010/0002152 A1 | 1/2010 | Nishioka et al. |
| 2010/0183037 A1 | 7/2010 | Furuya et al. |
| 2010/0321750 A1* | 12/2010 | Burinskiy ............... G09G 3/02 359/198.1 |
| 2011/0129015 A1 | 6/2011 | Nguyen et al. |
| 2011/0205498 A1 | 8/2011 | Brown et al. |
| 2011/0298844 A1 | 12/2011 | Butler et al. |
| 2012/0224235 A1* | 9/2012 | Hanada ............. G02B 26/0841 358/474 |
| 2012/0275001 A1* | 11/2012 | Ishibashi ............. H04N 9/3129 359/199.1 |
| 2013/0003080 A1 | 1/2013 | Humphrey |
| 2013/0107000 A1 | 5/2013 | Xue et al. |
| 2013/0120225 A1* | 5/2013 | Hanada ................. G09G 3/346 345/15 |
| 2013/0265498 A1 | 10/2013 | Asakawa |
| 2013/0286052 A1 | 10/2013 | Asakawa |
| 2014/0006347 A1 | 3/2014 | Hung |
| 2014/0126590 A1 | 5/2014 | Kimura |
| 2014/0153073 A1* | 6/2014 | Hsu .................... G02B 26/0833 359/214.1 |
| 2014/0218700 A1* | 8/2014 | Naftali ................. G09G 3/025 353/121 |
| 2016/0341955 A1 | 11/2016 | McVittie et al. |
| 2017/0131540 A1* | 5/2017 | Kolodkin ........... G02B 26/0841 |
| 2017/0329130 A1 | 11/2017 | Mitterlehner et al. |
| 2018/0013994 A1 | 1/2018 | Ogi et al. |
| 2018/0295331 A1 | 10/2018 | Tardif et al. |
| 2019/0020860 A1 | 1/2019 | McVittie |
| 2019/0049718 A1 | 2/2019 | Kato |
| 2019/0101744 A1 | 4/2019 | Kinstlich et al. |
| 2019/0235229 A1 | 8/2019 | Ujiie et al. |
| 2020/0011976 A1 | 1/2020 | Druml et al. |

* cited by examiner

MEMS RESONANCE CONTROL USING PHASE DETECTION

RELATED APPLICATION

This application is a Division of United States Application for patent Ser. No. 17/012,938, filed Sep. 4, 2020, which itself is a Continuation of United States Application for patent Ser. No. 16/585,751, filed Sep. 27, 2019, now U.S. Pat. No. 10,805,583, which in turn is a Continuation of United States Application for patent Ser. No. 16/032,634, filed Jul. 11, 2018, now U.S. Pat. No. 10,469,813, which itself is a Continuation-in-Part of United States Application for patent Ser. No. 15/850,667, filed Dec. 21, 2017, now U.S. Pat. No. 10,288,990. The contents of these applications are hereby incorporated by reference into this application to the maximum extent allowable under the law.

TECHNICAL FIELD

This application is related to the field of collimated light projection systems and, in particular, to the use of a graphics processing unit (GPU) to compensate pixel colors for non-linear response of a collimated light beam in a collimated light projection system, thereby eliminating a need for a specially programmed application specific integrated circuit (ASIC) to perform this functionality.

BACKGROUND

Certain laser scanning projection devices such as wafer defect scanners, laser printers, document scanners, projectors and the like often employ a collimated laser beam that scans across a flat surface in a straight line path. These devices employ tilting mirrors to deflect the collimated laser beam to perform the scanning. These tilting mirrors may be, or may include, Micro Electro Mechanical Systems ("MEMS") devices. The actuation of mirrors used in MEMS devices, referred to herein as MEMS mirrors, can be via the electromagnetic, electrostatic, piezoelectric, and thermoelectric effects, depending on application.

One type of common MEMS mirror includes a stator and a rotor, with the rotor or structures carried by the rotor being reflective. The stator and/or rotor are driven with a drive signal which results in the rotor oscillating with respect to the stator, thereby changing the angle of reflectance of an incident light beam on the rotor. By oscillating the rotor between two orientations, an opening angle of the mirror is defined, and scanning of the light beam across the flat surface is accomplished.

MEMS mirrors used in applications that utilize fast scanning rates (typically over 20 Khz) are often resonance mirrors due to the relative ease of maintaining a mirror at resonance as opposed to providing specific drive controls selecting travel limits for the mirrors or setting oscillation frequencies for the mirrors. Therefore, for these applications, it is desired to be able to precisely drive and maintain the mirrors at resonance. This is one area in which development is needed.

Naturally, precise control of the movement of the mirror is but one aspect of laser scanning projection devices. Another aspect is precise control of the collimated laser beam itself so as to ensure that the desired image or video is clearly displayed, with accurate colors. To that end, laser scanning projection devices typically include an application processor, a projection subsystem, and an optical module. The application processor functions to deliver a video stream to the projection subsystem. The projection subsystem processes the video stream and based upon that processing, properly drives the optical module so as to project the video onto a surface for viewing.

Typically, the projection subsystem includes an application specific integrated circuit (ASIC) that receives the video input from the application processor and controls a laser source driver and a mirror controller appropriately so as to effectuate control of the optical module by the laser source driver and mirror controller to project the video. The ASIC must be specifically designed to work with the geometry of the specific optical module used, and with the opening characteristics of the laser source driver, to keep the white point of the projected image constant over time.

Since the ASIC must be specifically designed, the cost of developing a laser projection system is higher than desired, since no "off the shelf" solution exists for the functionality provided by the ASIC. For each application, a new ASIC must be specifically designed. In order to lower the cost of development, further development in this area is also needed, here so as to provide for an "off the shelf" hardware solution.

SUMMARY

Light Source Response Compensation for Light Projection System Using a Graphics Processing Unit Described herein is a light projection system including a light module to emit a light beam, a movable mirror apparatus to reflect the light beam toward a surface, and a graphics processing unit (GPU). The GPU functions to receive video data and process the video data to compensate for a response of the light module, with the response of the light module being an optical power of the light beam produced by the light module for a given forward current through the light module. A light source driver controls the light module as a function of the processed video data. Colors of images from the video data produced on the surface by the light beam would otherwise not look as they are intended to look due to changing of the response of the light module, but the processing of the video data serves to alter the video data such that the colors of the images from the video data produced on the surface do look as they are intended to look.

The response of the light module would otherwise be non-linear but the processing of the video data compensates the video data such that the light source driver controls the light module so that the response is linear.

The video data may include pixel color values, and the GPU may store uncompensated pixel color values as correlated to compensated pixel color values in a lookup table. The GPU may compensate the pixel color values using the lookup table by replacing the pixel color values with corresponding ones of the compensated pixel color values from the lookup table so that when the light source driver controls the light module as a function of the processed video data, the light source driver controls the light module so that the response is linear.

The GPU may process the video data by performing a lookup of compensated pixel color values in the lookup table based upon the pixel color values. In addition, the GPU may estimate the response of the light module, and process the video data based thereupon.

The video data may include pixel color values, and the processing of the video data performed by the GPU may include compensating the pixel color values for the response of the light module.

The video data includes pixel color values, and the response of the light module would otherwise be non-linear, but the processing of the video data performed by the GPU may include compensating the pixel color values for the response of the light module such that when the light source driver controls the light module as a function of the processed video data, the response is linear.

The optical power of the light beam produced by the light module for a given forward current through the light module may change as a function of temperature, and the processing of the video data may compensate the video data for that change of the optical power of the light beam produced by the light module for the given forward current through the light module.

Light Source Response Tracking Using GPU

Also disclosed herein is a light projection system including a light module configured to emit a light beam, a movable mirror apparatus configured to reflect the light beam across a surface in a scan pattern, and a graphics processing unit (GPU). The GPU is configured to receive video data containing video images for display, estimate positions of the light beam on the surface as the movable mirror apparatus reflects the light beam across the surface in the scan pattern, with some of the positions being within a designated display area for the video images within the video data and with some of the positions being outside of the designated display area and designated as calibration positions, and process the video data based upon the estimated positions, the processing including adding calibration pixels to the video data for display in the calibration positions. An application specific integrated circuit (ASIC) is configured to receive the processed video data, and to generate a beam position control signal based thereupon. A mirror controller is configured to control the movable mirror apparatus as a function of the beam position control signal. A light driver is configured to control the light module as a function of the processed video data such that the video images are displayed within the designated display area and such that the calibration pixels are displayed in the calibration positions. Photodetection circuitry is configured to detect display of the calibration pixels.

The GPU may be further configured to receive compensation data that is based upon the detected calibration pixels, and process the video data to compensate for a response of the light module based upon the compensation data.

Colors of the video images displayed within the designated display area would otherwise not look as they are intended to look due the response of the light module, but the processing of the video data to compensate for the response of the light module serves to alter the video data such that the colors of the video images displayed within the designated display area do look as they are intended to look.

The GPU may process the video data by defining a two dimensional grid, with each element in the two dimensional grid representing the light beam at a different time, selecting which elements in the two dimensional grid are associated with the designated display area and selecting which elements in the two dimensional grid are not associated with the designated display area, selecting which elements in the two dimensional grid that are not associated with the designated display area but are associated with the calibration positions, mapping each element in the two dimensional grid associated with the designated display area to a corresponding pixel of a frame of the video images based upon the different positions of the light beam on the surface as the light beam as scanned in the scan pattern, and mapping each element in the two dimensional grid associated with a calibration position to one of the calibration pixels.

Multiple elements in the two dimensional grid may be associated with each calibration position such that multiple elements are mapped to each calibration pixel.

A number of elements mapped to each calibration pixel may depend on an intended display duration for each calibration pixel.

Data values for the calibration pixels may change dynamically over time based upon operation conditions of the light projection system.

Data values for the calibration pixels may be stored in a lookup table, and the GPU looks up those data values in the lookup table.

Data values for the calibration pixels may be stored in uniform variables, and the GPU reads the uniform variables to retrieve the data values.

The calibration positions relative to the designated display area may be predefined.

The calibration positions relative to the designated display area may be received by the GPU.

The photodetection circuitry may receive control signals causing detection to begin, the control signals being associated with display of the calibration pixels such that detection occurs when the calibration pixels are displayed.

The GPU has a massively parallel architecture.

The GPU is not an application specific integrated circuit (ASIC).

Also disclosed herein is a light projection system including a graphics processing unit (GPU) configured to receive video data containing video images for display, define a two dimensional grid, with each element in the two dimensional grid representing a position of a light beam at a different time, designate which elements of the two dimensional grid correspond to positions of the light beam in a designated display area, designate which elements of the two dimensional grid correspond to positions of the light beam outside of the designated display area, with some positions of the light beam outside of the display being designated as calibration positions, map each element of the two dimensional grid corresponding to positions of the light beam in the designated display area to a corresponding pixel of a frame of a video image within received video data, and map elements of the two dimensional corresponding to calibration positions to calibration pixels. An application specific integrated circuit (ASIC) is configured to receive the mapped pixels of the video image and mapped calibration pixels from the GPU, and to generate a beam position control signal based thereupon. A mirror controller is configured to control a movable mirror apparatus to be used in the light projection system as a function of the beam position control signal.

Photodetector circuitry may be configured to detect the calibration pixels when displayed. The GPU may be further configured to receive compensation data that is based upon the detected calibration pixels, and process the mapped pixels of the video images to compensate for a response of a light module generating the light beam, based upon the compensation data. Colors of the mapped pixels of the video image would otherwise not look as they are intended to look due the response of the light module, but the processing of the mapped pixels of the video data to compensate for the response of the light module serves to alter the mapped pixels such that the colors of the mapped pixels will look as intended when displayed.

Multiple elements in the two dimensional grid may be associated with each calibration position such that multiple elements are mapped to each calibration pixel.

A number of elements mapped to each calibration pixel may depend on an intended display duration for each calibration pixel.

Data values for the calibration pixels may change dynamically over time based upon operation conditions of the light projection system.

Data values for the calibration pixels may be stored in a lookup table, and the GPU may look up those data values in the lookup table.

Data values for the calibration pixels may be stored in uniform variables, and the GPU may read the uniform variables to retrieve the data values.

The calibration positions relative to the designated display area may be predefined.

The calibration positions relative to the designated display area may be received by the GPU.

MEMS Resonance Control Using Phase Detection

Also disclosed herein is a light projection system including a microelectromechanical (MEMS) mirror configured to operate in response to a mirror drive signal and to generate a mirror sense signal as a result of the operation, a mirror driver configured to generate the mirror drive signal in response to a drive control signal, and a controller. The controller is configured to a) receive the mirror sense signal from the MEMS mirror, b) obtain a first sample of the mirror sense signal at a first phase of the mirror drive signal, c) obtain a second sample of the mirror sense signal at a second phase of the mirror drive signal, the first and second phases being separated by a half period of the mirror drive signal, with the second phase occurring after the first phase, and d) generate the drive control signal as a function of a difference between the first and second samples so as to keep the mirror drive signal separated in phase from the mirror sense signal by a desired amount of phase separation.

The desired amount of phase separation may be 90 degrees.

The first phase may be 90 degrees and the second phase may be 270 degrees.

The desired amount of phase separation may be a phase separation at which the MEMS mirror is operating at its resonance frequency.

The desired amount of phase separation may be a phase separation at which the first and second samples are equal.

The first sample being less than the second sample may indicate that the phase separation between the mirror drive signal and mirror sense signal is less than 90 degrees, and the mirror may generate the drive control signal so as to increase the phase separation to 90 degrees.

The first sample being greater than the second sample may indicate that the phase separation between the mirror drive signal and mirror sense signal is greater than 90 degrees, and the mirror may generate the drive control signal so as to decrease the phase separation to 90 degrees.

The controller may be configured to, in an initial setup mode, generate the drive control signal so that the mirror drive signal is expected to be separated in phase from the mirror sense signal by the desired amount, and thereafter, in a normal operation mode, perform a), b), c), and d).

A light projection system includes a microelectromechanical (MEMS) mirror configured to operate based on a mirror drive signal and to generate a mirror sense signal as a result of the operation, a mirror driver configured to generate the mirror drive signal in response to a drive control signal, and a controller. The controller is configured to a) receive the mirror sense signal from the MEMS mirror, b) obtain first and second samples of the mirror sense signal, and c) generate the drive control signal such the first and second samples are equal.

The controller may obtain the first and second samples at phases of the mirror drive signal at which the first and second samples would be expected to be equal, and the controller may generate the drive control signal such that the first and second samples are actually equal.

The first and second samples being equal may indicate that the mirror drive signal and the mirror sense signal are separated in phase by a desired amount.

The first and second samples being equal may indicate that the MEMS mirror is operating at its resonance frequency.

The controller may be configured to, in an initial setup mode, generate the drive control so that the first and second samples will be expected to be equal, and thereafter, in a normal operation mode, perform a), b), and c) so that the first and second samples are actually equal.

A method may include steps of a) generating a mirror drive signal in response to a drive control signal and applying the mirror drive signal to a microelectromechanical (MEMS) mirror to drive oscillation of that mirror, b) sampling a mirror sense signal produced by the MEMS mirror twice to produce first and second samples, the first sample being sampled when the mirror drive signal is at a first phase, the second sample being sampled when the mirror drive signal is at a second phase that occurs subsequent to the first phase by half a period of the mirror drive signal, c) determining a difference between the first and second samples, d) adjusting the drive control signal based upon the difference, if the difference is other than zero, and e) returning to performing step a). The drive control signal after adjustment is expected to result in the mirror drive signal operating the MEMS mirror near or at its resonance frequency.

The adjustment of the drive control signal may serve to adjust a phase of the mirror drive signal so as to be separated from that of the mirror sense signal by 90 degrees, thereby operating the MEMS mirror at its resonance frequency.

The adjustment of the drive control signal may serve to adjust the phase of the mirror drive signal so as to be separated from that of the mirror sense signal by a desired phase difference, thereby operating the MEMS near its resonance frequency.

The first phase may be 90 degrees and the second phase may be 270 degrees.

The first sample being less than the second sample may result in the adjustment of the drive control signal at step d) such that a frequency of the mirror drive signal decreases.

The first sample being greater than the second sample may result in the adjustment of the drive control signal at step d) such that a frequency of the mirror drive signal increases.

The adjustment of the drive control signal may be expected to cause the mirror drive signal to be separated from the mirror sense signal by 90 degrees of phase.

MEMS Resonance Control Using Zero Cross Detection

Also disclosed herein is a light projection system including a microelectromechanical (MEMS) mirror configured to operate in response to a mirror drive signal and to generate a mirror sense signal as a result of the operation, a mirror driver configured to generate the mirror drive signal in response to a drive control signal, a zero cross detector configured to detect zero crosses of the mirror sense signal, and a controller configured to generate the drive control signal as a function of the detected zero crosses of the mirror sense signal.

The controller may generate the drive control signal as a function of the detected zero crosses by setting the drive control signal to be such that transitions of the mirror drive signal occur as a function of the detected zero crosses.

The controller may set the drive control signal to be such that the transitions of the mirror drive signal occur as a function of the detected zero crosses by determining peaks of the mirror sense signal as a function of the detected zero crosses, and adjusting the drive control signal to be such that transitions of the mirror drive signal occur at the determined peaks.

The controller may determine the peaks of the mirror sense signal as a function of the detected zero crosses by measuring elapsed time between successive detected zero crosses, determining a gap value to be equal to one half the measured elapsed time between successive detected zero crosses, and determining the peaks of the mirror sense signal to occur at times spaced apart from the detected zero crosses by the gap value.

The controller may measure the elapsed time between successive detected zero crosses by counting a number of clock cycles between successive detected zero crosses, and the controller may determine the gap value to be equal to one half the measured elapsed time by determining the gap value to be equal to one half the number of counted clock cycles between successive detected zero crosses.

The controller may be further configured to compensate the determined gap value be subtracting a response delay time from the gap value.

The response delay time is an elapsed time between generation of a given value of the mirror sense signal and determination of one half the number of counted clock cycles between successive detected zero crosses.

The controller, in an initial setup mode, may be configured to set the drive control signal to be such that transitions of the mirror drive signal occur at expected peaks of the mirror sense signal, and thereafter, in a normal operation mode, may be configured to determine peaks of the mirror sense signal as a function of the detected zero crosses, and set the drive control signal to be such that transitions of the mirror drive signal occur at the determined peaks.

The controller, in the normal operation mode, may determine the peaks of the mirror sense signal as a function of the detected zero crosses by measuring elapsed time between successive detected zero crosses, determining a gap value to be equal to one half the measured elapsed time between successive detected zero crosses, and determining the peaks of the mirror sense signal to occur at times spaced apart from the detected zero crosses by the gap value.

The controller, in the normal operation mode, may measure the elapsed time between successive detected zero crosses by counting a number of clock cycles between successive detected zero crosses, and the controller may determine the gap value to be equal to one half the measured elapsed time by determining the gap value to be equal to one half the number of counted clock cycles between successive detected zero crosses.

A method includes steps of a) generating a drive control signal for a mirror driver that generates a mirror drive signal in response to the drive control signal, the drive control signal being generated to be such that transitions of the mirror drive signal occur at expected peaks of an expected mirror sense signal, b) receiving an actual mirror sense signal from a microelectromechanical (MEMS) mirror driven by the mirror drive signal, c) detecting zero crosses of the actual mirror sense signal, d) determining when the actual mirror sense signal actually peaks, as a function of the detected zero crosses, e) adjusting the drive control signal such that the transitions of the mirror drive signal occur at the actual peaks of the actual mirror sense signal, and f) returning to performing step b).

Step d) may be performed by measuring an elapsed time between successive detected zero crosses and determining that the actual mirror sense signal actually peaks at times spaced apart from the detected zero crosses by one half the measured elapsed time.

The elapsed time between successive zero crosses may be measured by counting a number of clock cycles between the successive zero crosses, and one half the measured elapsed time is equal to one half the counted number of clock cycles.

Compensating the measured elapsed time to accommodate for a delay in performing steps b), c), and d) may be performed.

Also disclosed herein is a light projection system, including: a microelectromechanical (MEMS) mirror configured to operate in response to a mirror drive signal and to generate a mirror sense signal as a result of the operation of the MEMS mirror in response to the mirror drive signal; a laser configured to emit a laser beam directed at the MEMS mirror so that the MEMS mirror reflects the laser beam across a target surface in a scan pattern; a mirror driver configured to generate the mirror drive signal in response to a drive control signal; and a controller. The controller is configured to: a) receive the mirror sense signal from the MEMS mirror; b) obtain a first sample of the mirror sense signal at a first phase of the mirror drive signal; c) obtain a second sample of the mirror sense signal at a second phase of the mirror drive signal, wherein the first and second phases are separated by a half period of the mirror drive signal, with the second phase occurring after the first phase; and d) generate the drive control signal based upon the first and second samples so as to keep the mirror drive signal separated in phase from the mirror sense signal by a desired amount of phase separation.

The controller may be configured to, in an initial setup mode, generate the drive control signal so that the mirror drive signal is expected to be separated in phase from the mirror sense signal by the desired amount, and thereafter, in a normal operation mode, perform a), b), c), and d).

The desired amount of phase separation may be 90 degrees.

The first phase may be 90 degrees and the second phase may be 270 degrees.

The desired amount of phase separation may be a phase separation at which the MEMS mirror is operating at its resonance frequency.

The desired amount of phase separation may be a phase separation at which the first and second samples are equal.

The first sample being less than the second sample may indicate that the phase separation between the mirror drive signal and mirror sense signal is less than 90 degrees, and the mirror may generate the drive control signal so as to increase the phase separation to 90 degrees.

The first sample being greater than the second sample may indicate that the phase separation between the mirror drive signal and mirror sense signal is greater than 90 degrees. The mirror may generate the drive control signal so as to decrease the phase separation to 90 degrees.

A processing unit may be configured to: receive video data containing video images for display; and a laser driver configured to control the laser as a function of the video data such that the video images are displayed on the target surface.

DETAILED DESCRIPTION

It should be understood that in the descriptions below, any references to "laser", "laser beam", "RGB laser beam", "RGB beam", "collimated light", "collimated light beam" or "light" are intended to include any form of light, whether it be visible light, infrared light, or a combination of different forms or wavelengths of light. For example, a "laser" referred to below may be a single color laser, or may be a unified laser beam of multiple colors of visible light, such as a red-green-blue (RGB) laser beam. Also, a "laser" referred to below may be a combination of visible light and invisible light, with the visibility referring naturally to what the human eye can perceive. Therefore, a "light source", "laser source", or other piece of hardware referred to below is to be understood to be capable of producing any form of light as described above. As such, it is to be understood that the terms described above are not intended to be limiting, but are simply used for brevity and for sake of examples of possible embodiments from among many possible embodiments.

Figure 1:
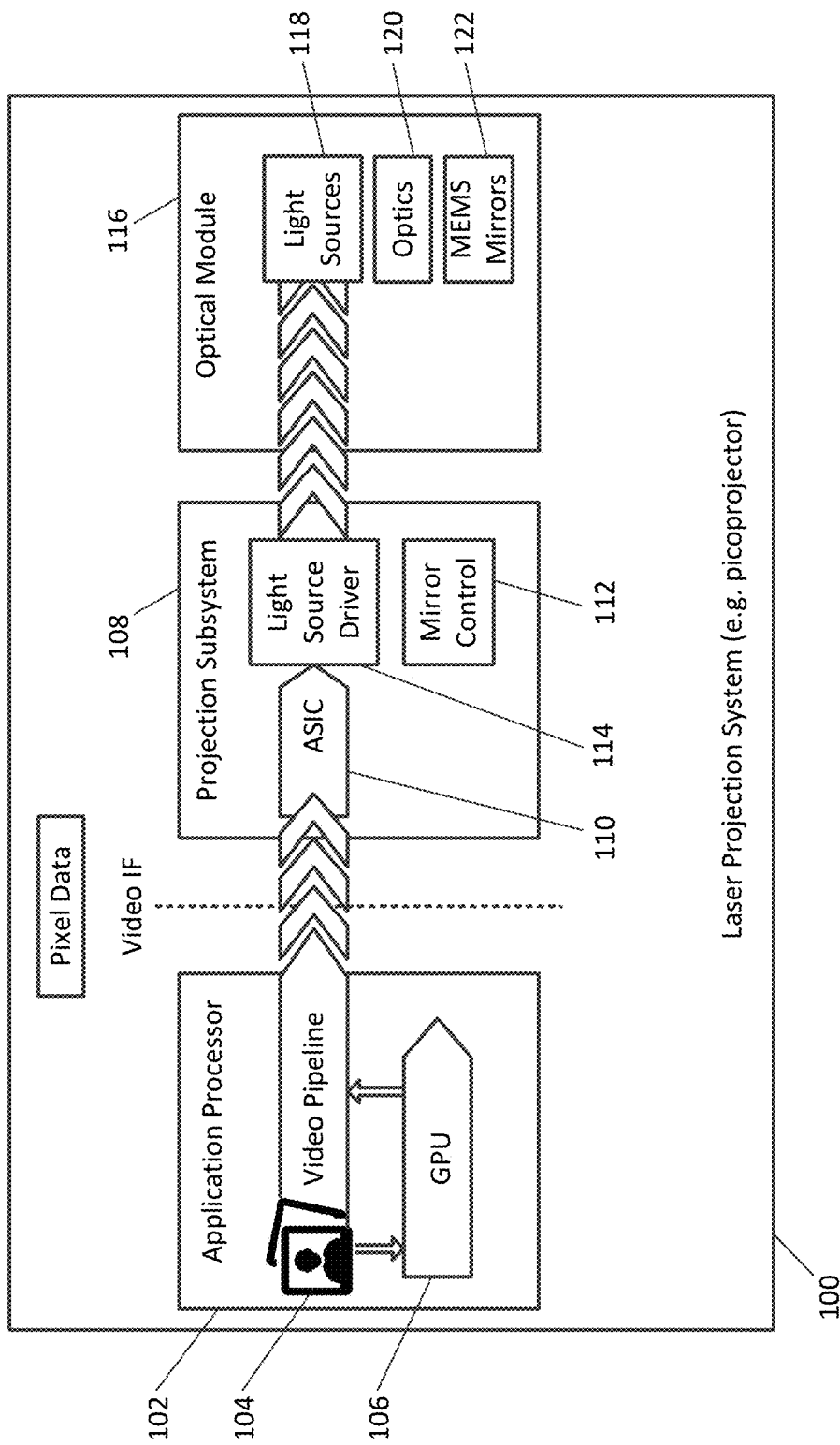
FIG. 1 is a schematic block diagram of a light projection system.

Light Source Response Compensation for Light Projection System Using a Graphics Processing Unit FIG. 1 shows a light projection system 100, which will be referred to below as a laser projection system for ease of understanding, but it should be understood that it may utilize any form of light, as described above. The laser projection system 100 may be a self-contained picoprojector, may be an add-on device for a smartphone, tablet, or laptop, or may be contained within a smartphone, tablet, or laptop depending upon the specific application. The laser projection system 100 may also be contained within a virtual reality device or augmented reality device, such as a headset or pair of smartglasses. The laser projection system 100 may be also be used in a three dimensional sensing device or an object or movement tracking device.

The laser projection system 100 includes an application processor 102, such as a system on a chip (SoC), which includes a separate graphics processing unit (GPU) 106. It should be understood that the GPU 106 contains a massively parallel architecture and is not simply a general purpose microprocessor, but is instead a GPU as understood by those of skill in the art. Stated another way, a general purpose microprocessor capable of performing graphical functions and calculations related to graphics is not a GPU—a GPU has a massively parallel architecture as known to those of skill in the art, which is unlike the architecture of a general purpose microprocessor. The purpose of the use of the GPU here, as will be explained, is to perform numerous computations in parallel simultaneously, which a standard general purpose microprocessor cannot do.

As will be explained below, the application processor 102 provides data to a projection subsystem 108, which itself includes an ASIC 110, a mirror controller 112, and a light source driver 114. The projection subsystem provides output to the optical module 116, which itself includes light sources 118 (lasers), optics 120 (lenses), and mirrors 122 (microelectromechanical mirrors). The optical module 116 operates to scan a laser beam across a video display area at a rate sufficient to create a static or moving image when viewed by humans, under control of the projection subsystem 108.

Use of GPU to Perform Vertex Shading and Texture Mapping

Figure 2:
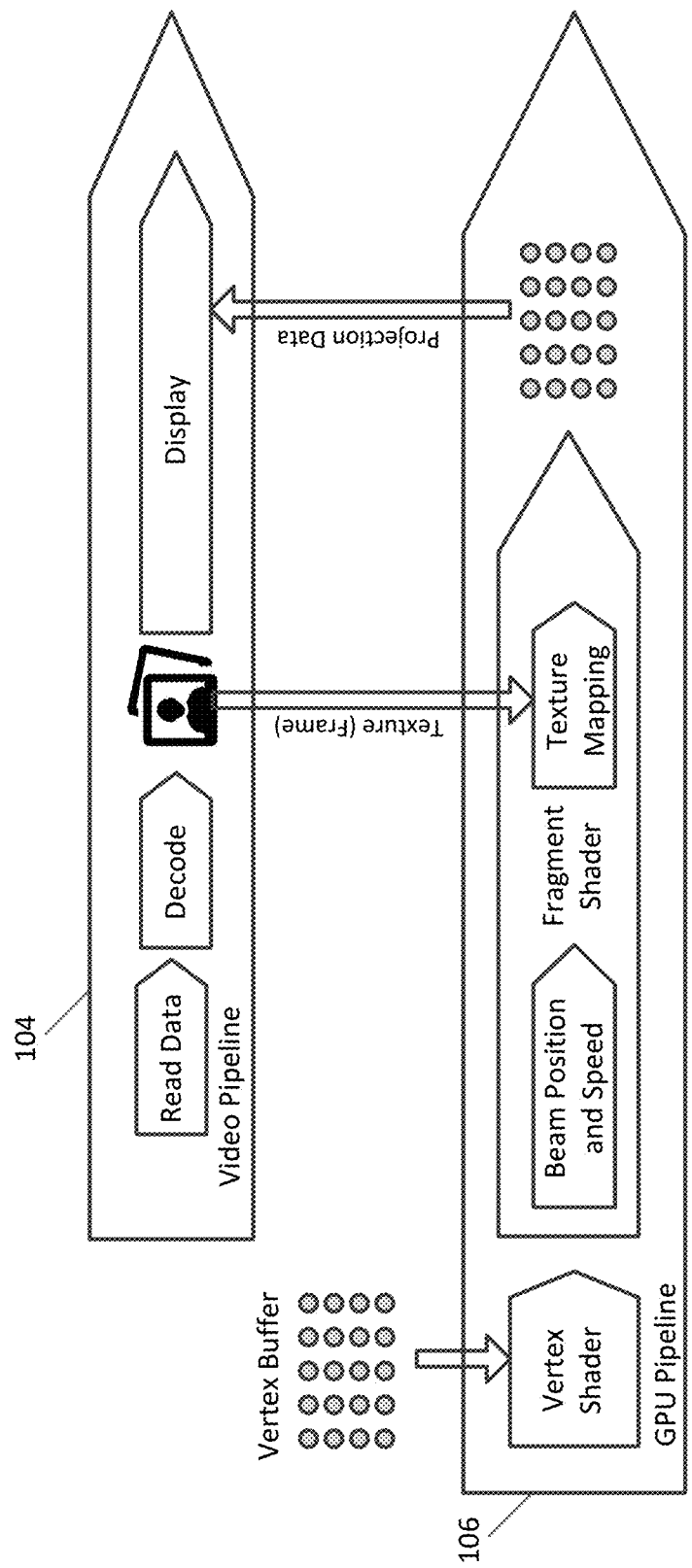
FIG. 2 is a diagram illustrating functions of the GPU pipeline and the video pipeline of FIG. 1.

With additional reference to FIG. 2, in operation, the application processor 102 receives video data in a video pipeline 104, such as read from non-volatile storage or received from an external device. The video data in the video pipeline 104 is decoded. The GPU 106 defines a two dimensional grid or vertex buffer, with each element in the two dimensional grid representing the generated laser beam position (generated by the optical module 116) at a different time (or clock cycle). In a texture mapping or pre-distortion operation, the GPU 106 uses its parallelism to map each element of the two dimensional grid to a corresponding pixel of a frame of the video data from the video pipeline 104, based upon the corresponding beam position for each element, in a parallel fashion. This mapping takes into account, and corrects for, the non-linearity of movement of the mirrors 122 over time, as well as geometric distortions caused by the fact that the scan patterns of the laser beam across the video display area are not evenly spaced lines, but are curved lines, and corrects for these conditions. The purpose for the texture mapping or predistortion is for the displayed image or video to be free from distortion, as well as for the colors of the displayed image or video to be consistent and accurately represented, as will be explained.

There is no dependency between data elements, thus enabling these operations to be performed in parallel quickly. In addition, the ASIC 110 of the projection subsystem 108 receives the video data for each time (or clock cycle), as processed by the GPU 106.

The ASIC 110 then sends appropriate control signals to the mirror controller 112 and/or the light source driver 114. The control signals sent to the mirror controller 112 are a function of characteristics of the optical module 116 and the required mirror movement, while the control signals sent to the light source driver 114 are a function of the processed video data.

The light source driver 114 then appropriately drives the light sources 118 to generate collimated light. The optics 120 focus the collimated light, and then the mirrors 122, under control of the mirror controller 112, appropriately scan the collimated light across the target at a sufficient speed so as to produce a video image viewable by the human eye.

In some applications, such as that shown in FIG. 2, the beam position and beam speed for each element of the two dimensional grid can be determined on the fly by the GPU 106. Due to the scan patterns of the laser beam across the video display area, at some locations, the beam spot will be moving faster than at other locations. For example, the beam spot moves faster when toward the center of the video display area than when toward an edge of the video display area. Thus, it is to be understood that the beam position changes dependent upon the beam spot, and changes dependent on time.

Figure 3:
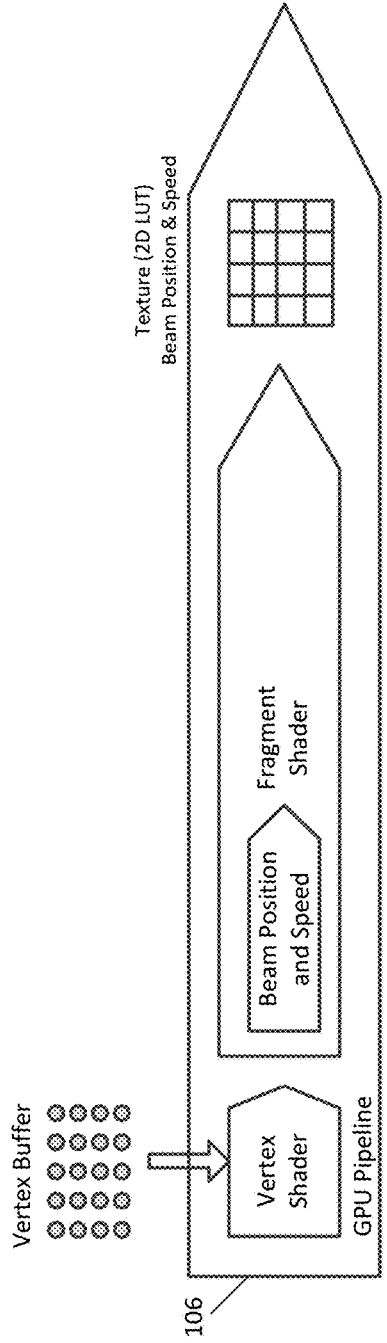
FIG. 3 is a diagram illustrating generation of a beam speed and position lookup table by the GPU pipeline of FIG. 1.
Figure 4:
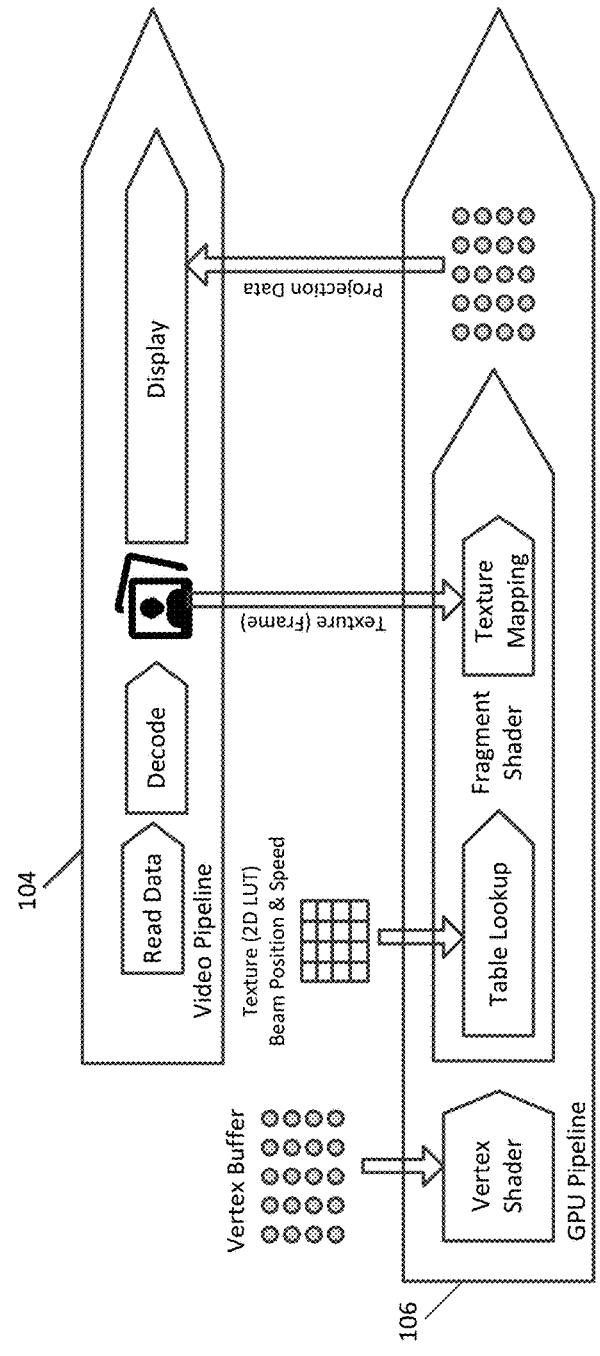
FIG. 4 is a diagram illustrating functions of the GPU pipeline and the video pipeline of FIG. 1 when using the beam speed and position lookup table as generated in FIG. 3.

In other applications, such as that shown in FIGS. 3-4, the beam position and beam speed for each element of the two dimensional grid can be determined in an initial setup phase by the GPU 106 (FIG. 3) and stored in a lookup table, and then during normal operation, rather than perform a determination on the fly, the beam position and beam speed can be retrieved from the lookup table (FIG. 4), thus reducing the computational load on the GPU 106.

In addition to the predistortion or texture mapping above that accounts for beam position, in some cases, the GPU 106 may also pre-modulate the elements of the two dimensional grid for intensity based upon the beam speed at those elements. Thus, an element having a higher beam speed may be modulated to have a higher intensity value than an element having a lower beam speed, and an element having a lower beam speed may be modulated to have a lower intensity value than an element having a higher beam speed. Such a case is shown in FIG. 4, where the video data as sent to the projection subsystem 108 is adjusted for beam speed.

Figure 5:
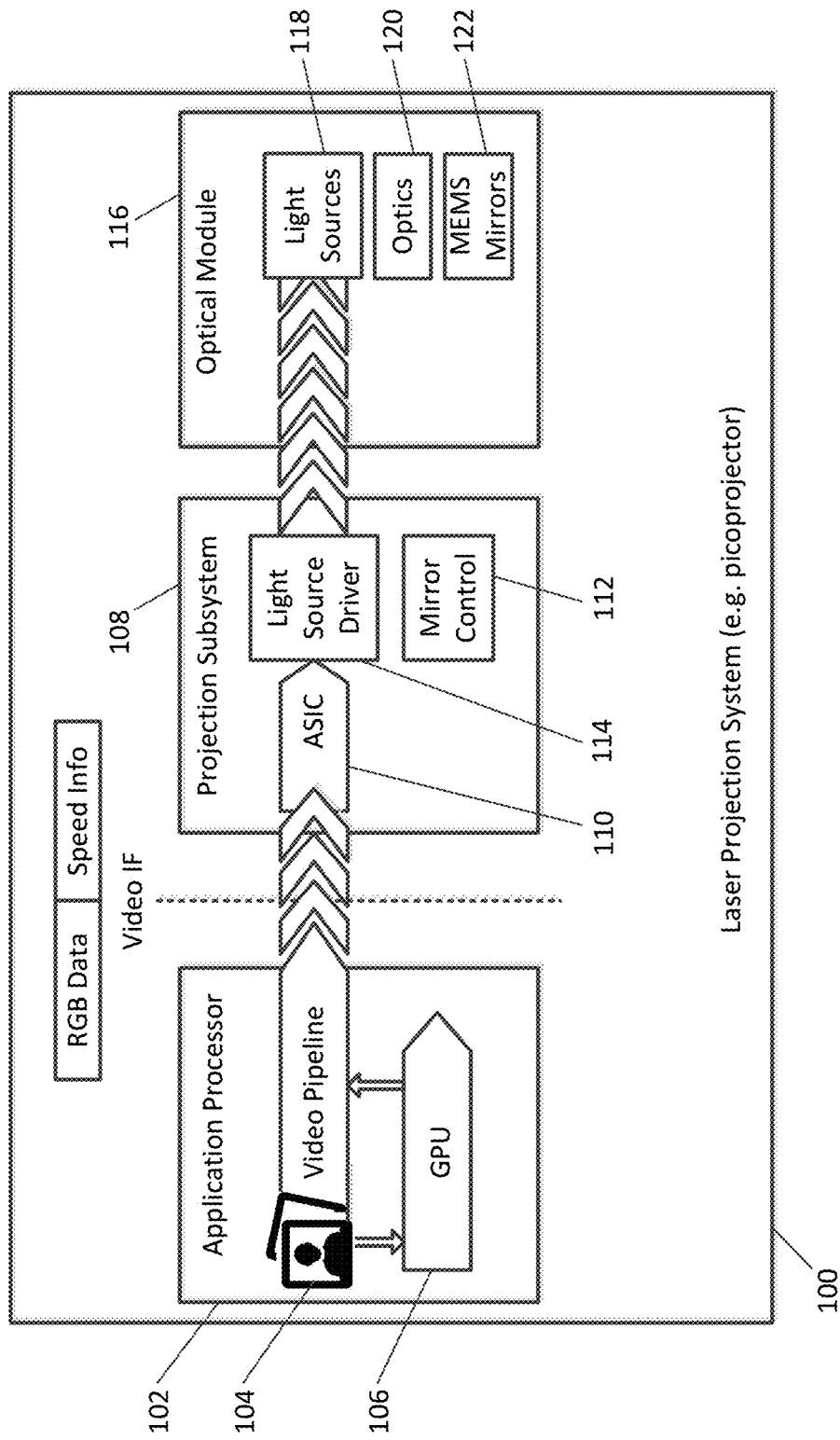
FIG. 5 is a diagram illustrating functions of the GPU pipeline and the video pipeline of FIG. 1.

In other cases, however, the video data as sent to the projection subsystem 108 is not adjusted for beam speed, as shown in FIG. 5. Here, the beam speed is embedded with the video data as metadata by the GPU 106, and the modulation is performed by the ASIC 110.

Upsampling of the video data may be performed by either the GPU 106 or the ASIC 110 where desirable.

The above described texture mapping, as performed by the GPU 106, is specific for the optics 120 and mirrors 122 used within the optical module 116. Thus, this operation is dependent on the details of those pieces of hardware, and is not generic to any suitable optics 120 and mirrors 122. As a consequence, the GPU 106 is specially programmed for the specific purpose of texture mapping when using the specific optics 120 and specific mirrors 122 within the optical module 116.

The precomputation of the texture mapping, or predistortion by the GPU 106, therefore means that the ASIC 110 need not be specially programmed for the specific optics 120 and specific mirrors 122 within the optical module 116, and can instead be a generic ASIC 110 usable with any optics 120 and mirrors 122.

Figure 6:
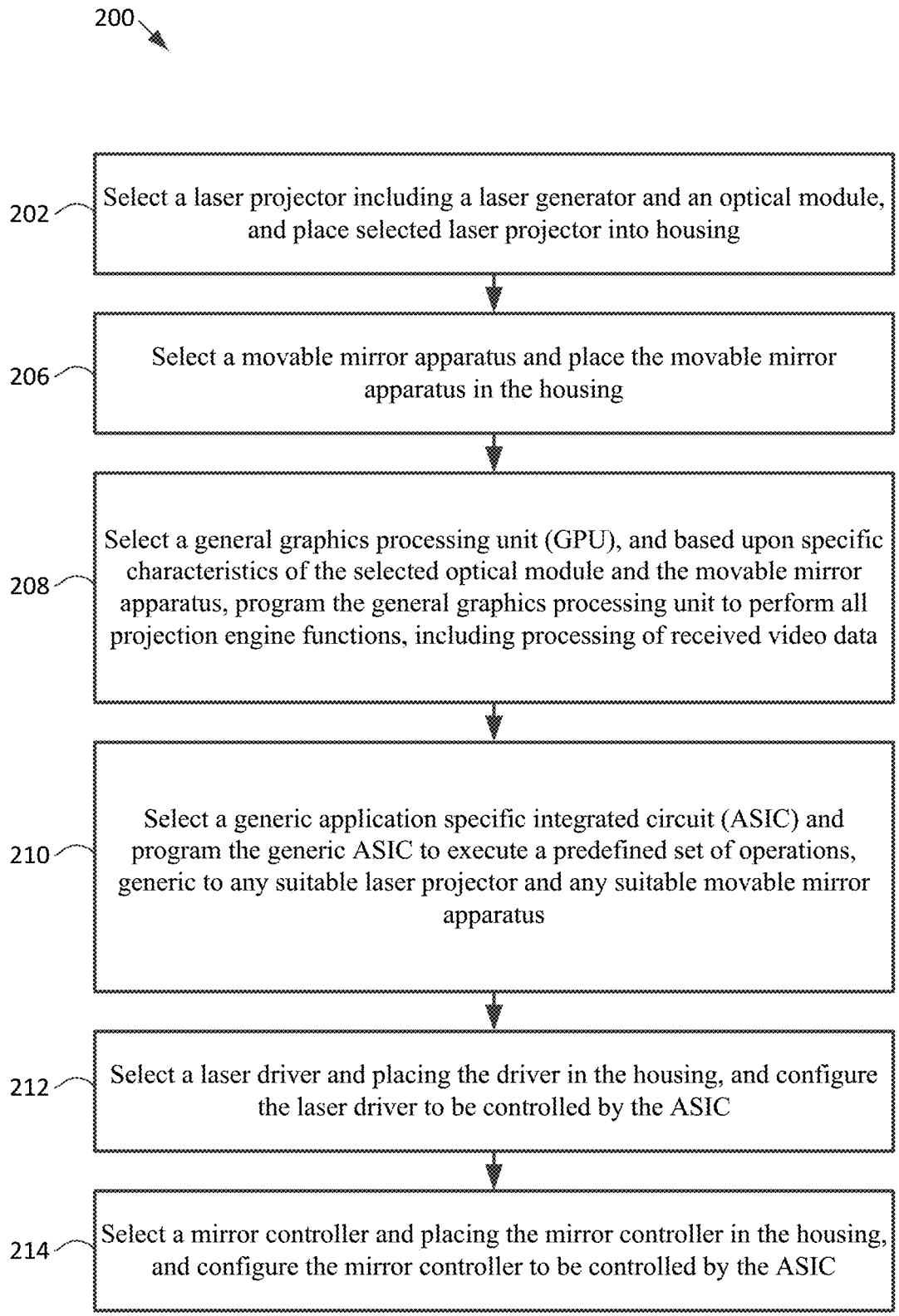
FIG. 6 is a flowchart of a method of making a light projection system.

With reference to the flowchart 200 of FIG. 6, a method of making a light projection system 100 (laser projection system) in accordance with this disclosure is now described. As stated, it may produce any form of collimated light of any wavelength, either as a single wavelength beam or as a combined beam, and is not limited in kind or type. The making of the laser projection system begins with selecting a laser projector (Block 202), which, as described above, includes a laser generator and an optical module. Then, the selected laser projector is placed into a housing for the laser projector. Thereafter, a movable mirror apparatus is selected and placed into the housing (Block 206). Then, a GPU is selected and programmed according to the specific characteristics of the selected optical module and selected movable mirror apparatus, so as to perform some or all projection engine functions and the processing of received video data (Block 208). This is a specific, special purpose programming, and only applies to the specific selected optical module and selected movable mirror apparatus; if this programming were, after creation, applied to a different optical module and/or different movable mirror apparatus, improper functioning would occur.

Next, a generic ASIC is selected and programmed to perform functions generic to any optical module and movable mirror apparatus (Block 210). Therefore, unlike the programming of the GPU, the programming of the ASIC is generic and applicable to multiple other optical modules and/or movable mirror apparatuses. Therefore, in some cases, an "off the shelf" pre-programmed ASIC may be used for a variety of different laser projection systems. Typically, the optical module and movable mirror apparatus are selected together with an ASIC, and thereafter the GPU with the appropriate characteristics is chosen; this allows the effects of the optical module and movable mirror apparatus on the movement of the beam spot and response of the lasers to be taken into account when selecting the GPU, which will perform the pre-distortion and compensation processes outlines above.

Next, the light source driver is selected and placed into the housing (Block 212). Thereafter, the mirror controller is selected and placed in the housing, and is then configured to be controlled by the ASIC.

Although the above method steps have been described in a specific order, it is to be understood that this order is not limiting, that these steps may be performed in any order, and also that the placement of components into the housing may be separately performed in any order.

Figure 7:
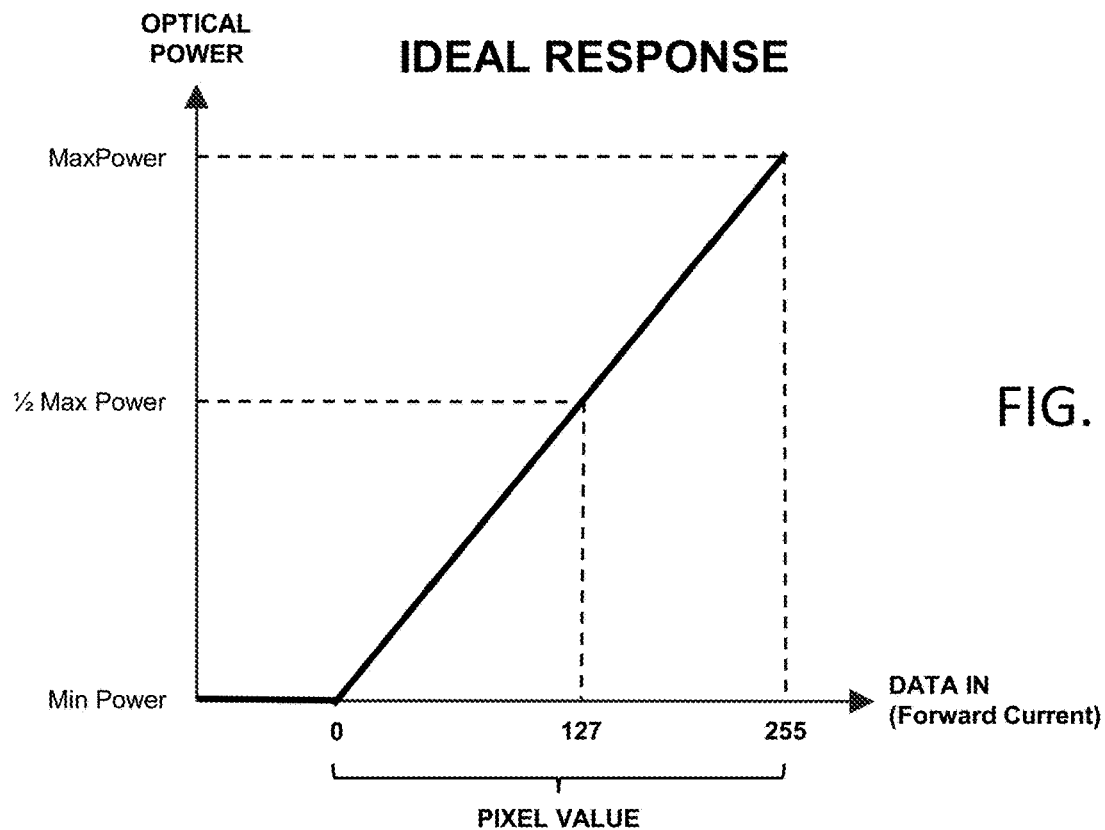
FIG. 7 is a graph showing the ideal response of a light source driver such as may be used with the light projection system of FIG. 1.
Figure 8:
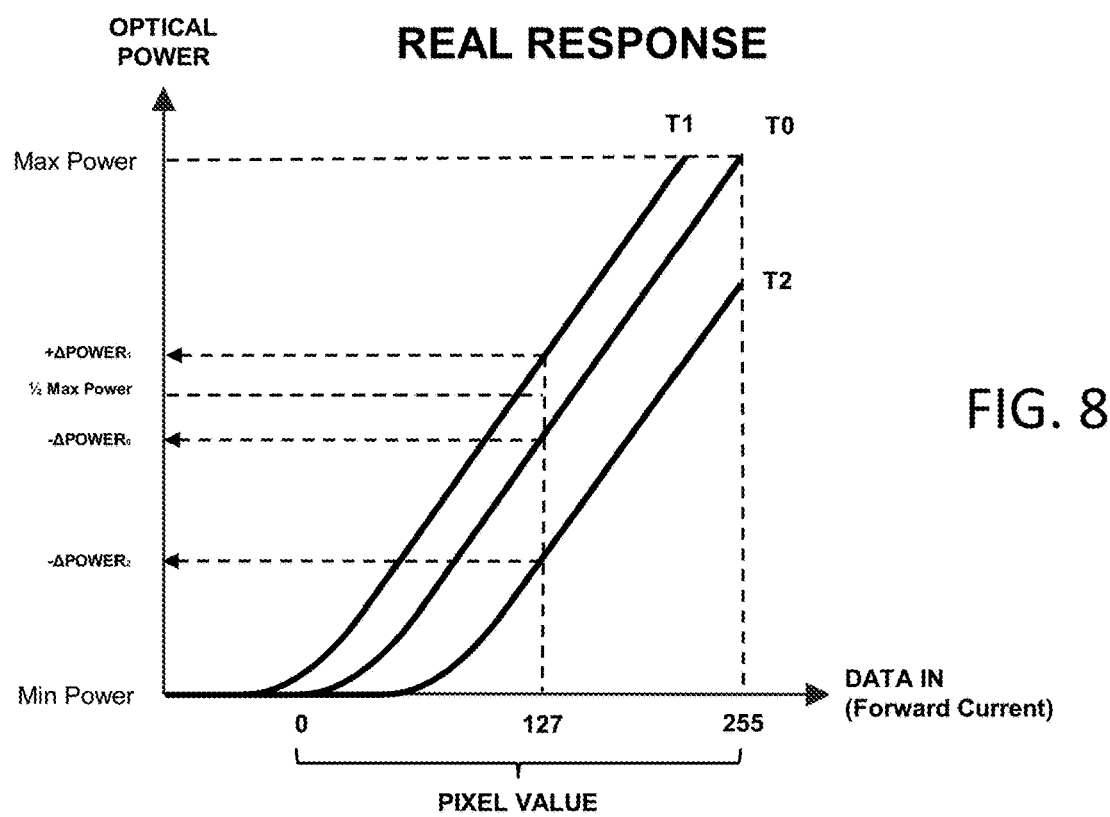
FIG. 8 is a graph showing the real response of a light source driver such as may be used with the light projection system of FIG. 1.

Use of GPU to Compensate Color Values of Pixels of Video Data for Response of Light Source Another concern in laser or light projection systems is the response of the light sources used to generate the laser or light beam. This response can be defined as an optical power of the laser beam as a function of forward current provided to the light sources by the light source driver. This directly affects the color of the beam spot produced. Therefore, this response can also be defined as the color of the beam spot produced as a function of the optical power of the laser beam. Ideally, as shown in FIG. 7, the color of the beam spot produced (shown numerically on the X axis of the graph as a number from 0 to 255, which represent hex values of 00 to FF) would be directly linearly proportional to the optical power of the laser beam regardless of temperature. However, the real (actual) color of the beam spot produced by a typical light source is not linearly proportional to the optical power of the laser beam as temperature varies. This can be seen in FIG. 8, where at a first temperature, the non-linear response curve T0 represents the real color of the beam spot produced by the light sources at different optical powers, while at a second temperature of the laser beam, the non-linear response curve T1 represents the real color of the beam spot produced by the light sources at different optical powers, and while at a third temperature, the non-linear response curve T2 represents the real color of the beam spot produced by the light sources at different optical powers.

If the white point of the beam spot were to vary, images and videos could visibly change in color over a range of operating temperatures, which would be noticeable to users and would therefore be commercially undesirable. Therefore, correction of this condition is desirable.

One way to correct this condition, so as to keep the white point of the beam spot consistent over a range of operating temperatures, is to regularly or continuously determine the response of the light sources, and compensate the color values of pixels of the received video data so that when the video data is reproduced on a projection surface by the scanning of the laser beam, the white point stays consistent regardless of operating temperature. This can be performed by the ASIC 110 (see FIG. 1). However, while an ASIC 110 is capable of performing this task effectively, the same issues arise with the use of the ASIC 110 as described above—each ASIC 110 would need to be customized for the specific optical properties of the optical module 116 used. Worse, each ASIC 110 would also need to be customized for the specific projection subsystem 108 used with that particular optical module 116. Together, this level of customization would add an undesirable amount of cost to the production of the laser projection system 100, rendering the final cost to consumers to be commercially undesirable.

Therefore, this functionality may be performed by the GPU 106', which is now described with reference to FIG. 9.

In operation, the application processor 102 receives video data in a video pipeline 104'. The video data in the pipeline is decoded. The GPU 106' defines a two dimensional grid or vertex buffer, with each element in the two dimensional grid representing the generated laser beam position (generated by the optical module 116) at a different time (or clock cycle). In a texture mapping operation, the GPU 106' uses its parallelism to map each element of the two dimensional grid to a corresponding pixel of a frame of the video data from the video pipeline 104', based upon the corresponding beam position for each element, in a parallel fashion. This mapping takes into account, and corrects for, geometric distortions caused by the fact that the scan patterns of the laser beam across the video display area are not evenly spaced lines, but are curved lines, and corrects for the geometric distortions. The purpose for the texture mapping or predistortion is so that the displayed image or video is free from distortion. There is no dependency between data elements, enabling these operations to be performed in parallel quickly.

Figure 9:
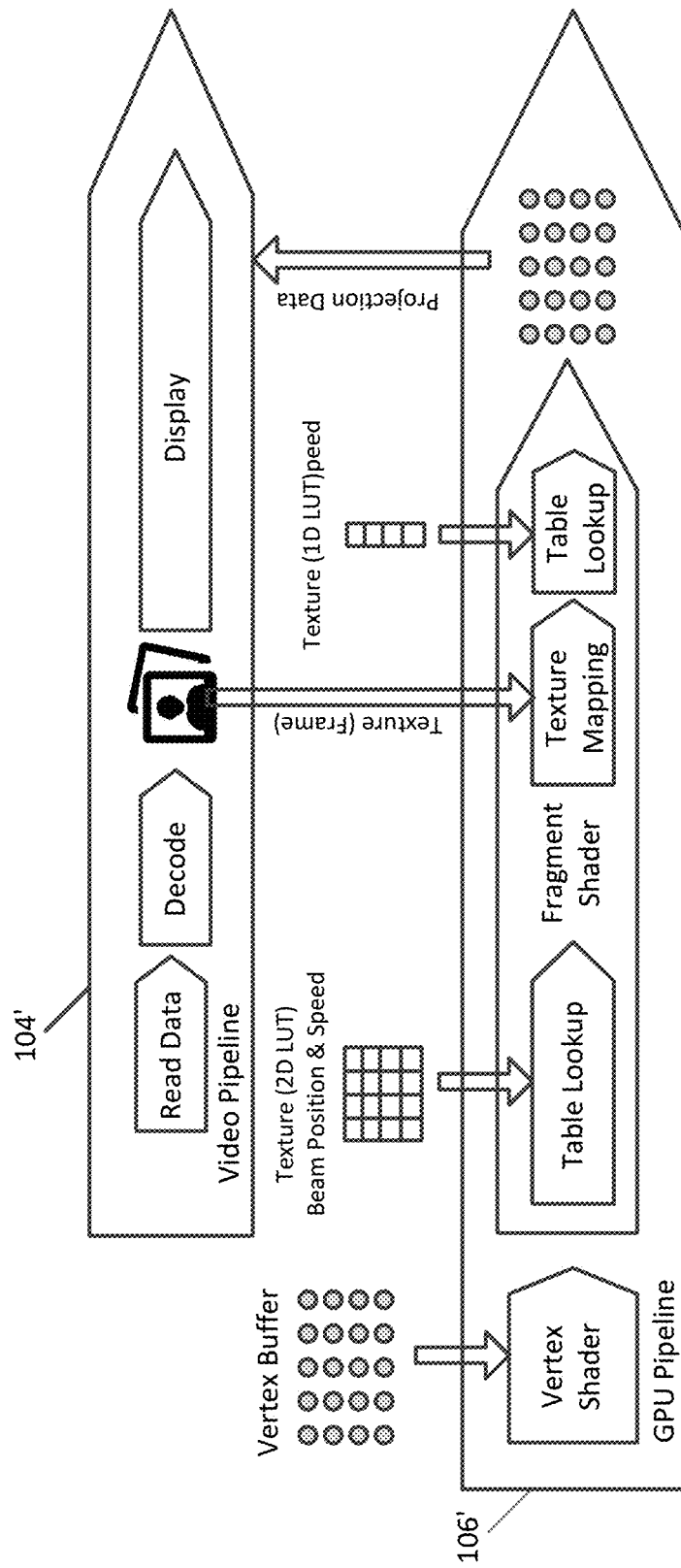
FIG. 9 is a diagram illustrating function of the GPU pipeline and the video pipeline of FIG. 1 when compensating the video data for the response of the light source driver.

In the case shown in FIG. 9, the beam position and beam speed for each element of the two dimensional grid is determined in an initial setup phase by the GPU 106' and stored in a first lookup table, and then during normal operation, rather than perform a determination on the fly, the beam position and beam speed can be retrieved from the first lookup table, thus reducing the computational load on the GPU 106'.

In addition, the GPU 106' performs compensation of the color values of the pixels of the video data so that the response of the light sources 118 remains linear and constant across temperature variations, meaning that the white point of the beam spot produced by the laser beam generated by the light sources 118 as it impinges on a projection surface stays consistent across temperature variations.

In some instances, the GPU 106' performs this compensation on the fly. This may be performed by the GPU 106' continuously, or periodically (e.g., every 2 seconds, every 4 seconds, etc.) In performing the compensation, the GPU 106' may determine what the response of the light sources 118 would be at the present time.

The response of the light sources 118 at the present time is the current provided to generate the laser beam (e.g., forward current to the light sources 118) versus the optical power output of the laser beam, which can also be thought of as the color of the beam spot produced as a function of the optical power of the laser beam. Based on this response, the GPU 106' can adjust the color values of the pixels of the video stream so as to cause the actual response to be linear and consistent across temperature.

The determination of the response of the light sources 118 may be performed in different ways. For example, it may be performed by measuring the current provided to generate the laser beam and measuring an operating temperature, or by just measuring the operating temperature, for example. In cases where the temperature is known or can be inferred, the GPU can receive as input the current temperature continuously or periodically, and determine the response based upon the temperature.

Another way to determine the response of the light sources 118 is to measure the current optical power of the light sources 118 using a photodiode, and measuring the forward current to the light sources 118. This way, the response can be directly known, and can be received by the GPU 106' continuously or periodically.

In yet other examples, the response may be assumed or predetermined, and not actually measured.

In the example shown in FIG. 9, the GPU 106' has predetermined what the correction would be for each possible color value of the pixels of the laser beam, has stored those corrected values in a second lookup table, and simply looks up the current color value of each pixel in the second lookup table and replaces it with the corresponding compensated value in the lookup table. As an example, if a given pixel has a current color value of 207, performing a lookup may return a value of 211, so the current color value of that pixel may be updated to the compensated value of 211. This predetermination may occur in an initial setup phase with appropriate values being determined and stored in the second lookup table, or the second lookup table may be pre-programmed into the laser projection system 100 at the time of manufacture and firmware loading. Performing the lookup helps to reduce the computational load on the GPU 106.

Figures 10A, 10B:
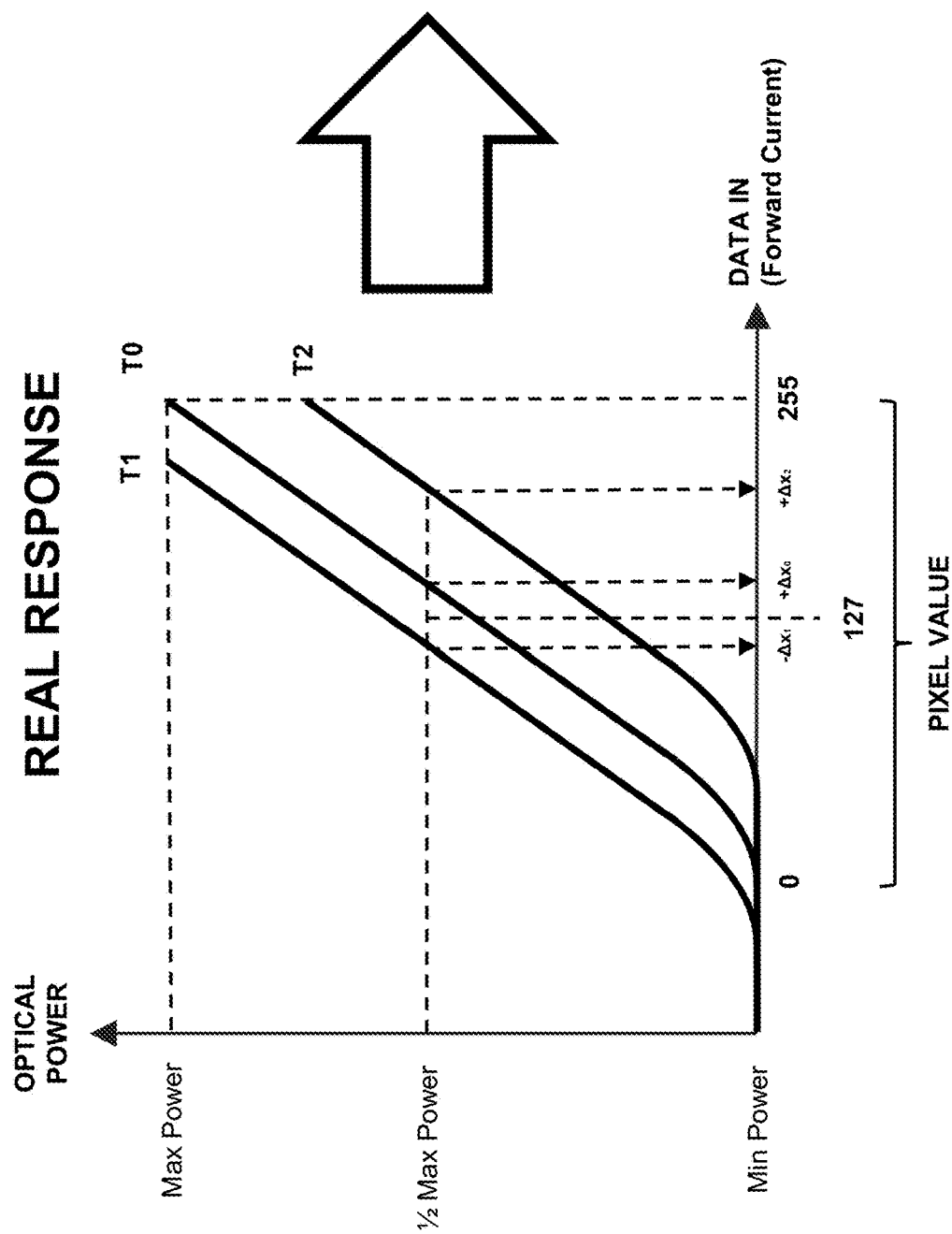
FIG. 10A is a graph showing the real response of the light source driver of the light projection system of FIG. 1.
FIG. 10B is a sample lookup table to be used to correct the response of the light source driver of the light projection system of FIG. 1.

The real response of the light sources 118 across temperatures T0, T1, and T2 can be seen in FIG. 10A. Here, it can be seen that a color value of 127 for a pixel at an optical power of 50% would not represent a linear response at any of operating temperatures T0, T1, or T2. This is undesirable. It can also be seen that, however, at an optical power of 50%, a color value of $127+\Delta x_0$ would represent a linear response at an operating temperature of T0, a color value of $127-\Delta x_1$ would represent a linear response at an operating temperature of T1, and a color value of $127+\Delta x_2$ would represent a linear response at an operating temperature of T2.

Therefore, the lookup table shown in FIG. 10B contains corrected values that would be linear at the current operating temperature (which, for the example shown in FIG. 10B, is temperature T0). Therefore, when the color value of 127 is looked up in the table index, the result is $127+\Delta x_0$. Consequently, when the GPU 106' compensates the video data for response of the light sources 118, it would change the color value of every pixel that was 127 to instead be $127+\Delta x_0$. The current operating temperature, and thus what values are to be used for correction, can be determined via measurement, for example, and the proper lookup table for that operating temperature may be used.

With the video data now compensated, the ASIC 110 of the projection subsystem 108 receives the video data for each time (or clock cycle), as processed by the GPU 106'.

The ASIC 110 then sends appropriate control signals to the mirror controller 112 and/or the light source driver 114. The control signals sent to the mirror controller 112 are a function of characteristics of the optical module 116 and the required mirror movement, while the control signals sent to the light source driver 114 are a function of, among other things, the color values of the pixels of the processed video data.

The light source driver 114 then appropriately drives the light sources 118 to generate collimated light. The optics 120 focus the collimated light, and then the mirrors 122, under control of the mirror controller 112, appropriately scan the collimated light across the target at a sufficient speed so as to produce a video image viewable by the human eye.

It bears repeating that all functionality described above is performed by the GPU to take advantage of its massively parallel structure. It is performed on a generic GPU that may be used in any application. The purpose of this is so as to avoid the use of an ASIC or other specially designed circuit. The purpose of this is also so as to avoid the use of a general purpose central processing unit (CPU), microprocessor, or microcontroller. Therefore, each and every step performed by the GPU is to be understood as not being performed by an ASIC, CPU, microprocessor, microcontroller, system on a chip, processor, or type of processing device at all that is not a GPU. Thus, each and every step performed by the GPU is performed by a GPU and a GPU only, to the exclusion of all other components and processing devices. Note that an ASIC, CPU, microprocessor, microcontroller, system on a chip, processor, or other processing device that performs graphics function is not a GPU, and that a GPU (as described above) contains a different structure that emphasizes massive parallelism. Thus, what makes a GPU a GPU is not the fact that it is capable of, or is, performing graphics functions, but this parallelism, and any other device, regardless of the functions that it is capable or, or is, performing is not a GPU. This applies to all techniques described in this application as being performed using a GPU, and not just the above.

The data in the second lookup table may be static and predetermined, as stated. As an alternative, the data in the second lookup table may be altered by the GPU based upon measurement of the temperature or optical response. The data itself may represent an estimation of the non-linear response curve in a one dimensional fashion.

It should be understood that the various techniques described above serve to improve the functionality of the laser or light projection system 100 itself. As explained, by compensating the color values of the pixels of the video data, the white point of images and video displayed on a projection surface is kept consistent across operating conditions, which prior art techniques were unable to do. This is a tangible, observable, real world result, and an improvement in laser projection system 100 technology. In fact, this is actually a physical result, since the displayed images and video are displayed as a result of generated photons striking the projection surface and then reflecting back to strike the eyes of an observer. The color interpreted by the human eye is a function of properties of the photons striking the rods and cones in the human eye. Thus, the actual photons produced by the laser projection system 100 are altered through this compensation described above, and photons are particles. Moreover, the various steps described above may also be considered to be rules that, when followed and applied, enable realization this new and previously unobtainable result (without the use of a complex ASIC) of the white point of images and video displayed by the laser projection system 100 on the projection surface.

Light Source Response Tracking Using GPU

As described in detail above, the video data is compensated for the response of the laser or light beam used, in some embodiments. As also stated, the response of the laser can be determined by measuring the light output by the laser with one or more photodiodes. Such measurement of the response of the laser using one or more photodiodes will now be described.

In general the response of the laser can be determined by using the laser to display one or more calibration pixels at locations on the target where the video data is not being displayed and sensing the light of those calibration pixels using one or more photodiodes, with the GPU functioning to obtain data values for the calibration pixels and modifying the video data such that the calibration pixels are displayed, and the GPU compensating the colors of the video for the response of the laser as measured using the calibration pixels and one or more photodiodes.

Figure 11:
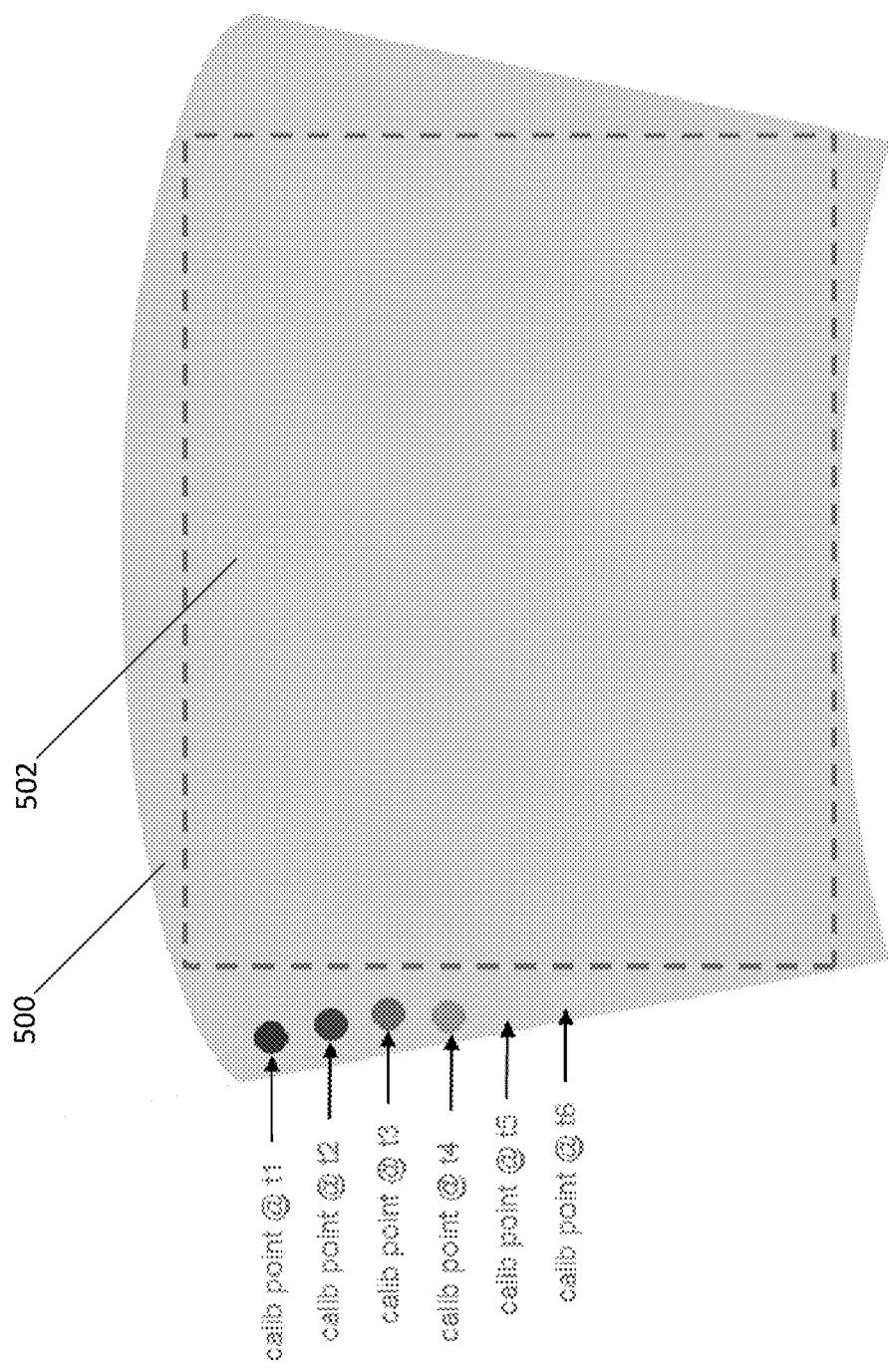
FIG. 11 is a diagram showing the scan pattern formed by the light projection systems in operation, as well as a designated display area within the scan pattern and calibration pixels displayed at calibration points outside of the scan pattern.

This can be easily understood with reference to FIG. 11. Depicted in FIG. 11 is a scan pattern 500 formed by scanning of the laser across the target, as described above. Defined within the scan pattern 500 is a designated video display area 502. Calibration pixels t1-t6 are displayed at defined calibration points outside of the designated video display area 502. It is these calibration pixels t1-t6 that are sensed, and the data from the sensing is used by the GPU to compensate the video data so that its colors will be properly displayed.

Figure 12:
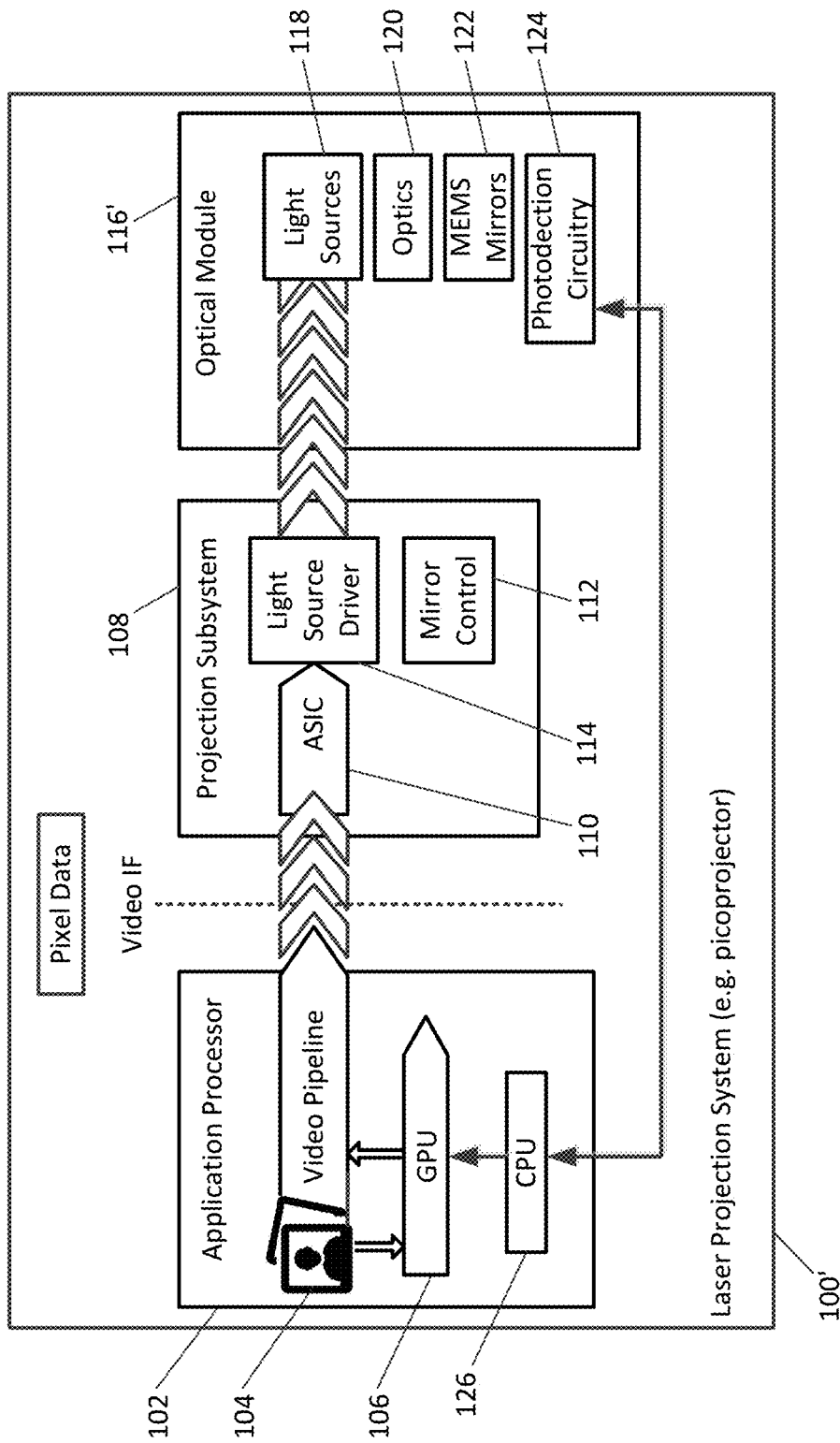
FIG. 12 is a schematic block diagram of another light projection system.

This technique will now be described in detail. Shown in FIG. 12 is a light projection system 100', such as a laser projection system. The laser projection system 100' may be a self-contained picoprojector, may be an add-on device for a smartphone, tablet, or laptop, or may be contained within a smartphone, tablet, or laptop depending upon the specific application. The laser projection system 100' may also be contained within a virtual reality device, or augmented reality device, such as a headset or pair of smartglasses.

The laser projection system 100' includes an application processor 102', such as a system on a chip, which includes a separate graphics processing unit (GPU) 106 and a central processing unit (CPU) 126. It should be understood that the GPU 106 contains a massively parallel architecture and is not simply a general purpose microprocessor, but is instead a GPU as understood by those of skill in the art. Stated another way, a general purpose microprocessor capable of performing graphical functions and calculations related to graphics is not a GPU—a GPU has a massively parallel architecture as known to those of skill in the art, which is unlike the architecture of a general purpose microprocessor like the CPU 126.

As will be explained below, the application processor 102' provides data to a projection subsystem 108, which itself includes an ASIC 110, a mirror controller 112, and a light source driver 114. The projection subsystem provides output to the optical module 116', which itself includes light sources 118 (lasers), optics 120 (lenses), mirrors 122 (microelectromechanical mirrors), and photodetection circuitry 124. The optical module 116 operates to scan a laser beam across a video display area at a rate sufficient to create a static or moving image when viewed by humans, under control of the projection subsystem 108.

Figure 13:
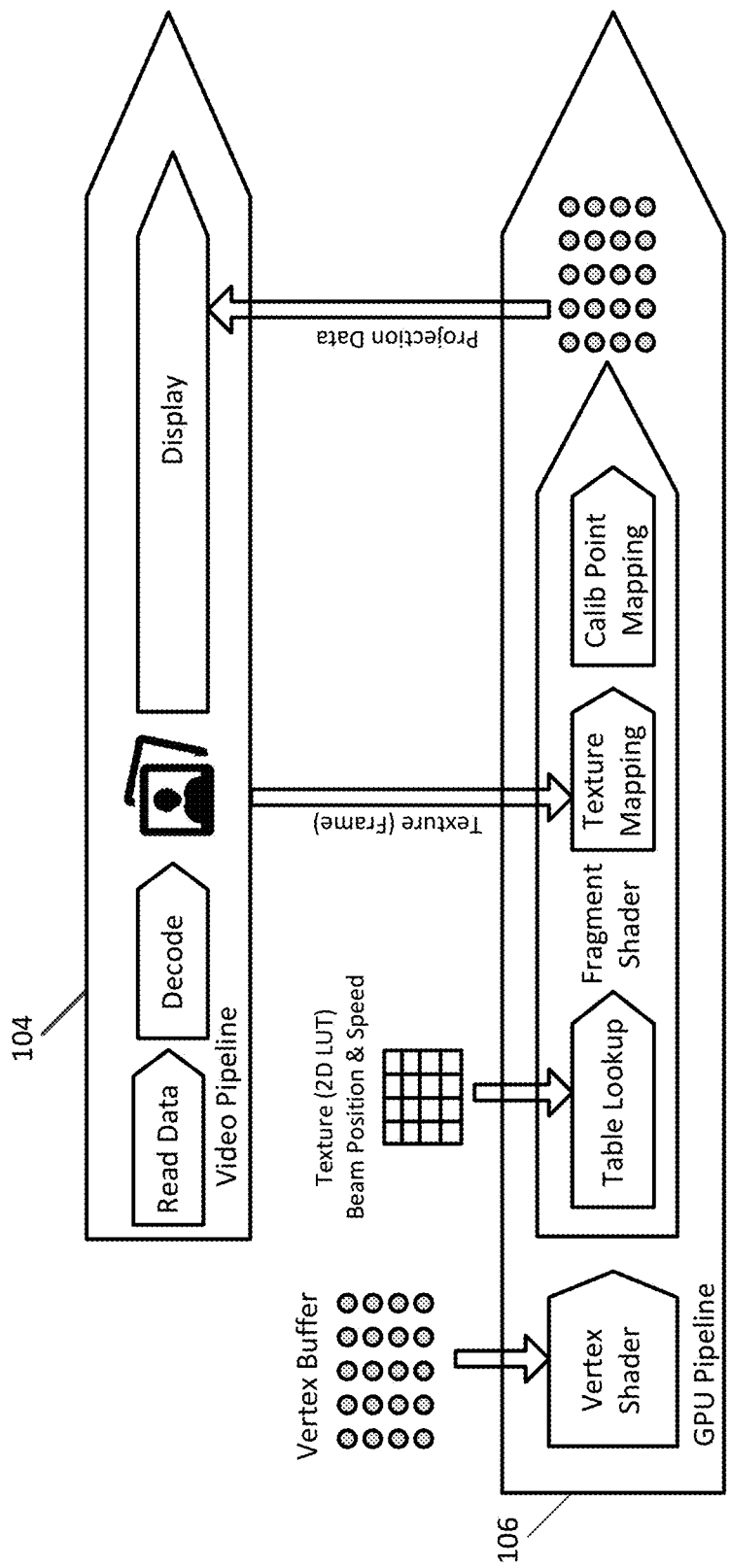
FIG. 13 is a diagram illustrating functions of the GPU pipeline and the video pipeline of FIG. 1 when performing light source compensation using photodetection circuitry as feedback.

With additional reference to FIG. 13, in operation, the application processor 102' receives video data in a video pipeline 104, such as read from non-volatile storage or received from an external device. The video data in the video pipeline 104 is decoded. The GPU 106 defines a two dimensional grid or vertex buffer, with each element in the two dimensional grid representing the generated laser beam position (generated by the optical module 116') at a different time (or clock cycle).

In a texture mapping or pre-distortion operation, the GPU 106 uses its parallelism to map each element of the two dimensional grid. A subset of elements of the two dimensional grid correspond to the designated display area 502, and a remainder of elements of the two dimensional grid correspond to locations of the scan pattern 500 outside of the designated display area 502 (see FIG. 11). Of the elements of the two dimensional grid corresponding to locations of the scan pattern 500 outside of the designated display area 502, some correspond to designated calibration positions t1-t6.

Elements of the two dimensional grid corresponding to the designated display area 502 are mapped by the GPU 106 to a corresponding pixel of a frame of the video data from the video pipeline 104, based upon the corresponding beam position for each element, in a parallel fashion. Elements of the two dimensional grid corresponding to the designated calibration positions t1-t6 are mapped by the GPU 106 to corresponding calibration pixels. Elements of the two dimensional grid not corresponding to either the designated display area 502 or calibration positions t1-t6 have their data values set to a zero value.

Figure 14:
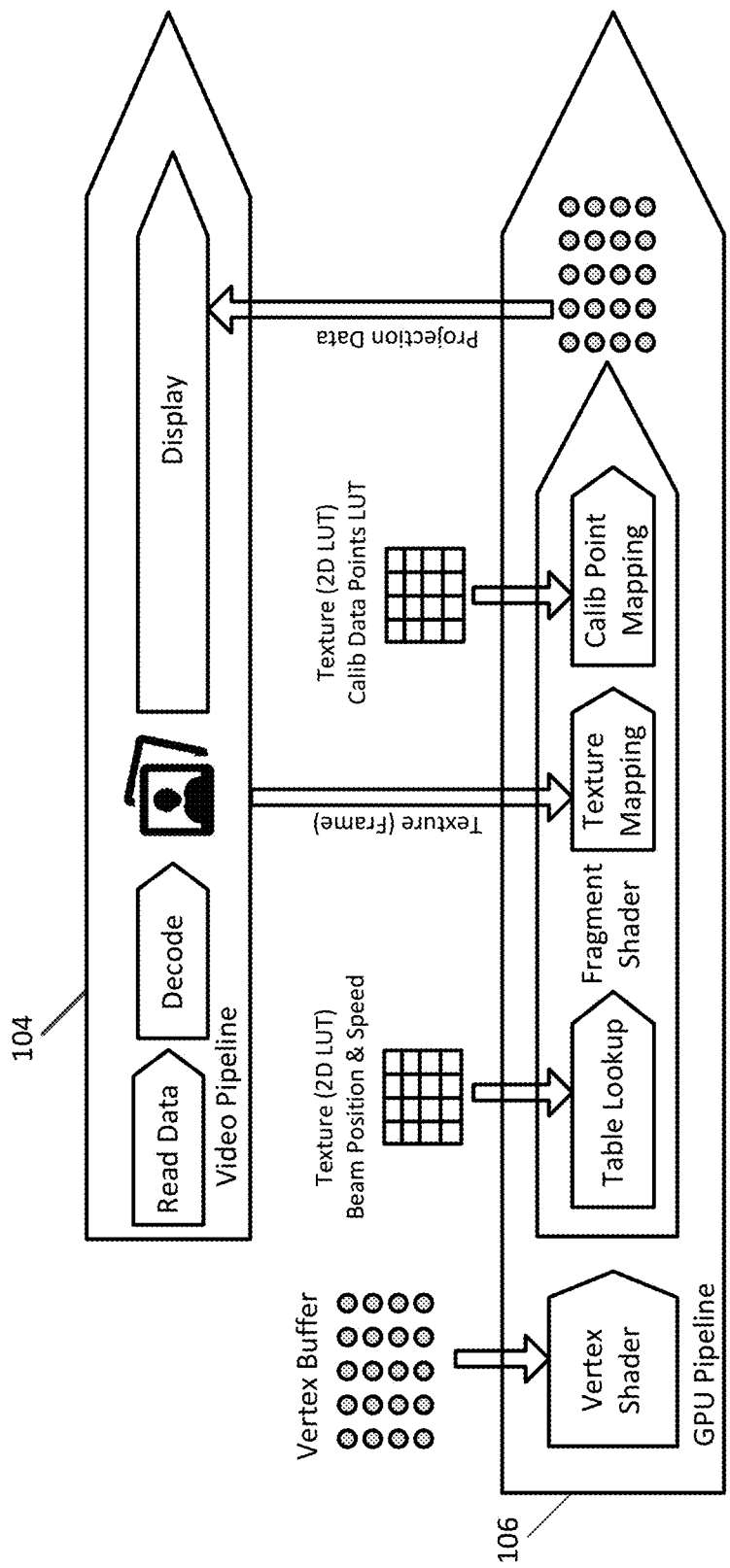
FIG. 14 is a diagram illustrating functions of the GPU pipeline and the video pipeline of FIG. 1 when performing light source compensation using photodetection circuitry as feedback, when reading calibration pixel values from a lookup table.
Figure 15:
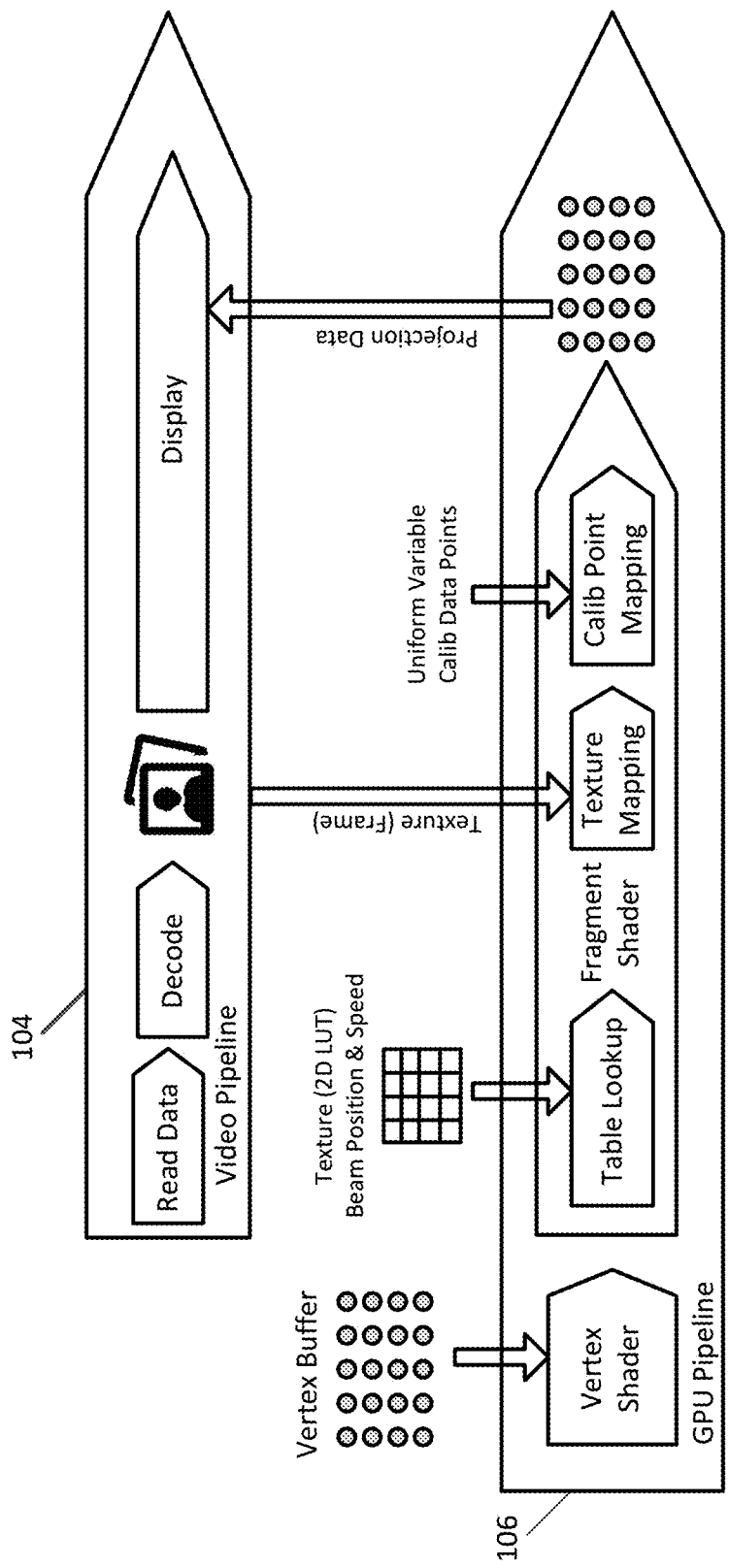
FIG. 15 is a diagram illustrating functions of the GPU pipeline and the video pipeline of FIG. 1 when performing light source compensation using photodetection circuitry as feedback, when reading calibration pixel values from uniform variables.

The values of the calibration pixels to be displayed at the calibration positions t1-t6 can be hard coded in the fragment shader (FIG. 13), can be retrieved by the GPU 106 from a lookup table stored internally to the fragment shader or externally to the fragment shader (FIG. 14), or can be retrieved by the GPU 106 from uniform variables (FIG. 15). The locations in the scan pattern for the calibration positions can be received by the GPU 106 from an external source, such as the CPU 126.

Note that the values of the calibration pixels can change with operating conditions such as temperature, and that therefore any of the locations from which the values of the calibration pixels are read or received may contain different values for different operating temperatures. Also note that different calibration pixels will display different colors and/or different intensities, and that the range of possible values for the calibration pixels depends on the number of bits used to indicate color in the system.

In addition, note that multiple adjacent and contiguous elements of the two dimensional grid may be mapped to a single calibration pixel, and that these elements will be adjacent and contiguous in a line. As an example, each calibration pixel may have four adjacent and contiguous elements of the two dimensional grid mapped to it.

In the cases shown in FIGS. 13-15, the beam position and beam speed for each element of the two dimensional grid is determined in an initial setup phase by the GPU 106 and stored in a first lookup table, and then during normal operation, rather than perform a determination on the fly, the beam position and beam speed can be retrieved from the first lookup table, thus reducing the computational load on the GPU 106.

As explained above, the GPU 106 performs compensation of the color values of the pixels of the video images of the video data so that the response of the light sources 118 remains linear and constant across temperature variations, meaning that the white point of the beam spot produced by the laser beam generated by the light sources 118 as it impinges on a projection surface stays consistent across temperature variations. This compensation is performed by modifying the color values of the pixels of the video data so that when those pixels are displayed, the colors appear as they are intended to be displayed.

In some instances, the GPU 106 performs this compensation on the fly. This may be performed by the GPU 106 continuously, or periodically (e.g., every 2 seconds, every 4 seconds, etc.) In performing the compensation, the GPU 106 may determine what the response of the light sources 118 would be at the present time.

The response of the light sources 118 at the present time is the current provided to generate the laser beam (e.g., forward current to the light sources 118) versus the optical power output of the laser beam, which can also be thought of as the color of the beam spot produced as a function of the optical power of the laser beam. Based on this response, the GPU 106 can adjust the color values of the pixels of the video stream so as to cause the actual response to be linear and consistent across temperature.

To this end, the GPU 106 communicates the elements of the two dimensional grid mapped to calibration positions to the CPU 126, as well as the beam position and beam speed at those calibration positions. The CPU 126, with the knowledge of when the calibration pixels will be displayed and for how long the calibration pixels will be displayed, controls the photodetection circuitry 124 so that the photodetection circuitry can detect the calibration pixels when displayed. Thus, the CPU 126, using the photodetection circuitry 124, determines the optical power of the laser beam. This optical power is passed by the CPU 126 back to the GPU 106 for use in determining the compensation to be used on the color values of the pixels of the video data as described. Details of the techniques used to perform the compensation, given knowledge of the response of the light sources 118, may be found above.

The ASIC 110 of the projection subsystem 108 receives the video data for each time (or clock cycle), including the calibration pixels, as processed by the GPU 106.

The ASIC 110 then sends appropriate control signals to the mirror controller 112 and/or the light source driver 114. The control signals sent to the mirror controller 112 are a function of characteristics of the optical module 116 and the required mirror movement, while the control signals sent to the light source driver 114 are a function of the processed video data.

The light source driver 114 then appropriately drives the light sources 118 to generate collimated light at the appropriate times to display both pixels of the video data as well as the calibration pixels. The optics 120 focus the collimated light, and then the mirrors 122, under control of the mirror controller 112, appropriately scan the collimated light across the target at a sufficient speed so as to produce a video image viewable by the human eye, as well as to display the calibration pixels. Note that the calibration pixels are not typically shown for a period of time sufficient for the human eye to perceive them, so the calibration pixels are not noticed by viewers and do not distract viewers.

MEMS Resonance Control Using Phase Detection

As stated, for some applications, it is desirable to operate a MEMS mirror such that it oscillates at its resonance frequency. This is typically performed by driving the MEMS mirror with a mirror drive signal, measuring the opening angle of the MEMS mirror during operation, and adjusting the mirror drive signal based on that measurement so that the opening angle matches a maximal opening angle for that MEMS mirror. This achieves operation at resonance, since the opening angle of a MEMS mirror is maximal at its resonance frequency. However, the specific implementations of this typically rely upon analog to digital conversion of a mirror sense signal from the MEMS mirror from which the opening angle is calculated, the generation of a digital mirror drive signal, and the digital to analog conversion of the digital mirror drive signal so as to produce the mirror drive signal. Unfortunately, if the resonance frequency of the MEMS mirror is high (e.g., above 20 Khz, for example), then frequency limitations of analog to digital converters and digital to analog converters become of concern.

Multiple new operation and control techniques are provided which operate to maintain a MEMS mirror at its resonance frequency (or simply close to resonance, if desired). As a quick summary, a first technique to maintain a MEMS mirror at its resonance frequency involves sampling a mirror sense signal from the MEMS mirror at times where the mirror drive signal is separated in phase by 180 degrees, and then adjusting the mirror drive signal based on a difference between those two samples, with the aim of the adjustment being to yield equal samples of the mirror sense signal when measured at times where the mirror drive signal is separated in phase by 180 degrees.

Figure 16:
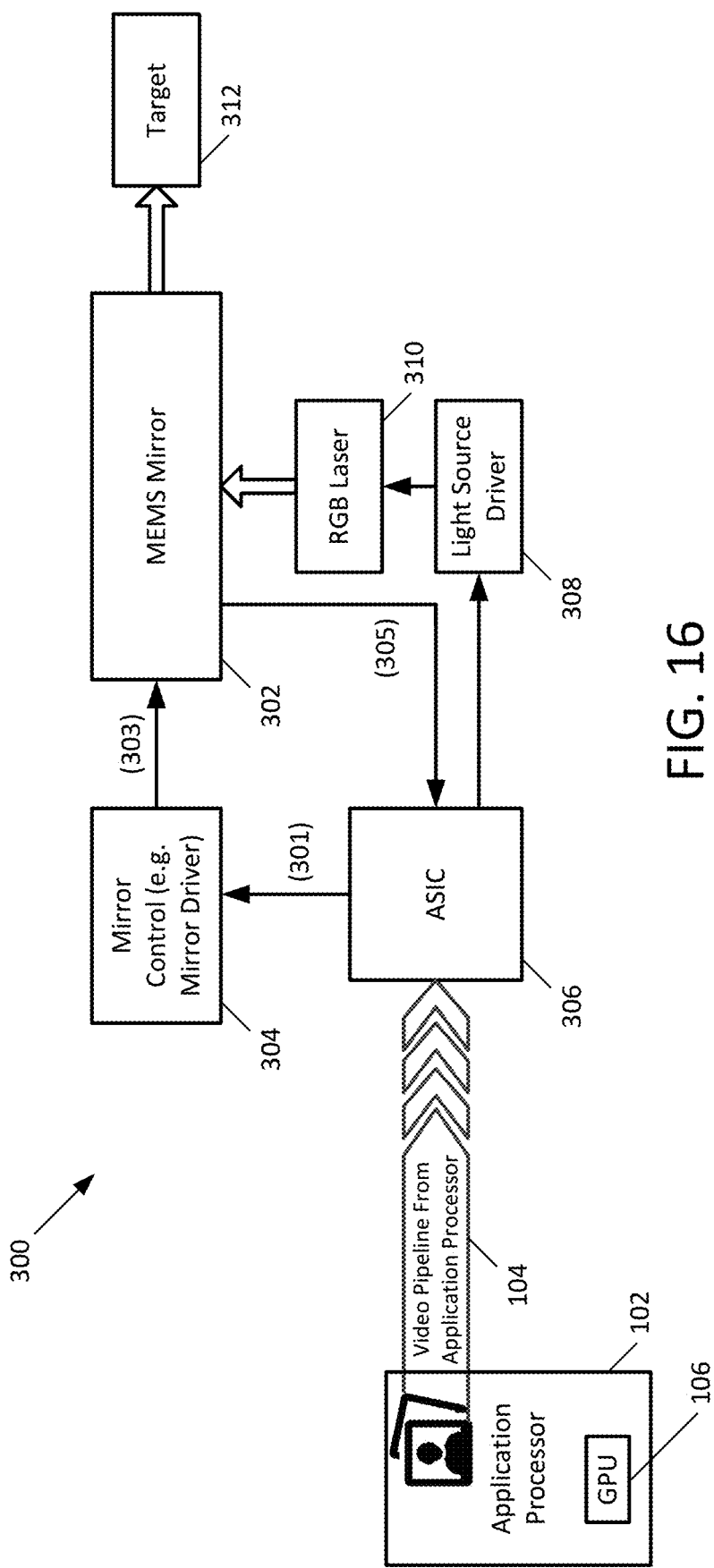
FIG. 16 is a schematic block diagram of another light projection system.

The first technique is now described with reference to FIG. 16. The MEMS mirror control system 300 includes an application specific integrated circuit (ASIC) 306 coupled to a video pipeline 104 from an application processor 102. The ASIC 306 receives a video signal encoded within the video pipeline 104, processes the video signal, and then sends control signals to a light source driver 308 that controls a combined red-green-blue laser 310 (or any beam of light) aimed at a MEMS mirror 302. This MEMS mirror 302 is a resonance mirror that may be piezoelectrically operated or magnetically operated, and may be a uni-axial mirror or a bi-axial mirror.

The ASIC 306 also generates a drive control signal 301 to control a mirror driver 304, which in turn generates a mirror drive signal 303 for the MEMS mirror 302. The MEMS mirror 302 oscillates under control of the mirror drive signal 303, reflecting the RGB laser 310 across the target 312 at a rate sufficient to create a static or moving image when viewed by the human eye. Note that the application processor 102 optionally contains a GPU 106 which may be used for performing some processing on the video pipeline 104, as described extensively above.

The ASIC 306 receives a mirror sense signal 305 from the MEMS mirror 302. The frequency of oscillation of the MEMS mirror 302 is related to the phase difference between the mirror drive signal 303 and the mirror sense signal 305. If the MEMS mirror 302 is operating at its resonance frequency, this phase difference will be 90 degrees. If this phase difference is less than 90 degrees, then the MEMS mirror 302 is oscillating at above its resonance frequency, and if the phase difference is greater than 90 degrees, then the MEMS mirror 302 is oscillating at below its resonance frequency.

By determining what this phase difference is and using it as feedback, and by controlling the frequency of the drive control signal 301 based on this feedback so that the phase difference is 90 degrees, the MEMS mirror 302 is operated at its resonance frequency.

Initially (upon device powerup, for example), the ASIC 306 generates the drive control signal 301 so as to set the mirror drive signal 303 to be at the expected resonance frequency of the MEMS mirror 302. Since this will rarely result in the MEMS mirror 302 actually oscillating at its resonance frequency, the control loop described above is utilized. To determine the phase difference, the ASIC 306 samples the mirror sense signal 305 at times separated by half periods of the mirror drive signal 303 at which the samples would be equal if the phase difference is 90 degrees.

Figure 17:
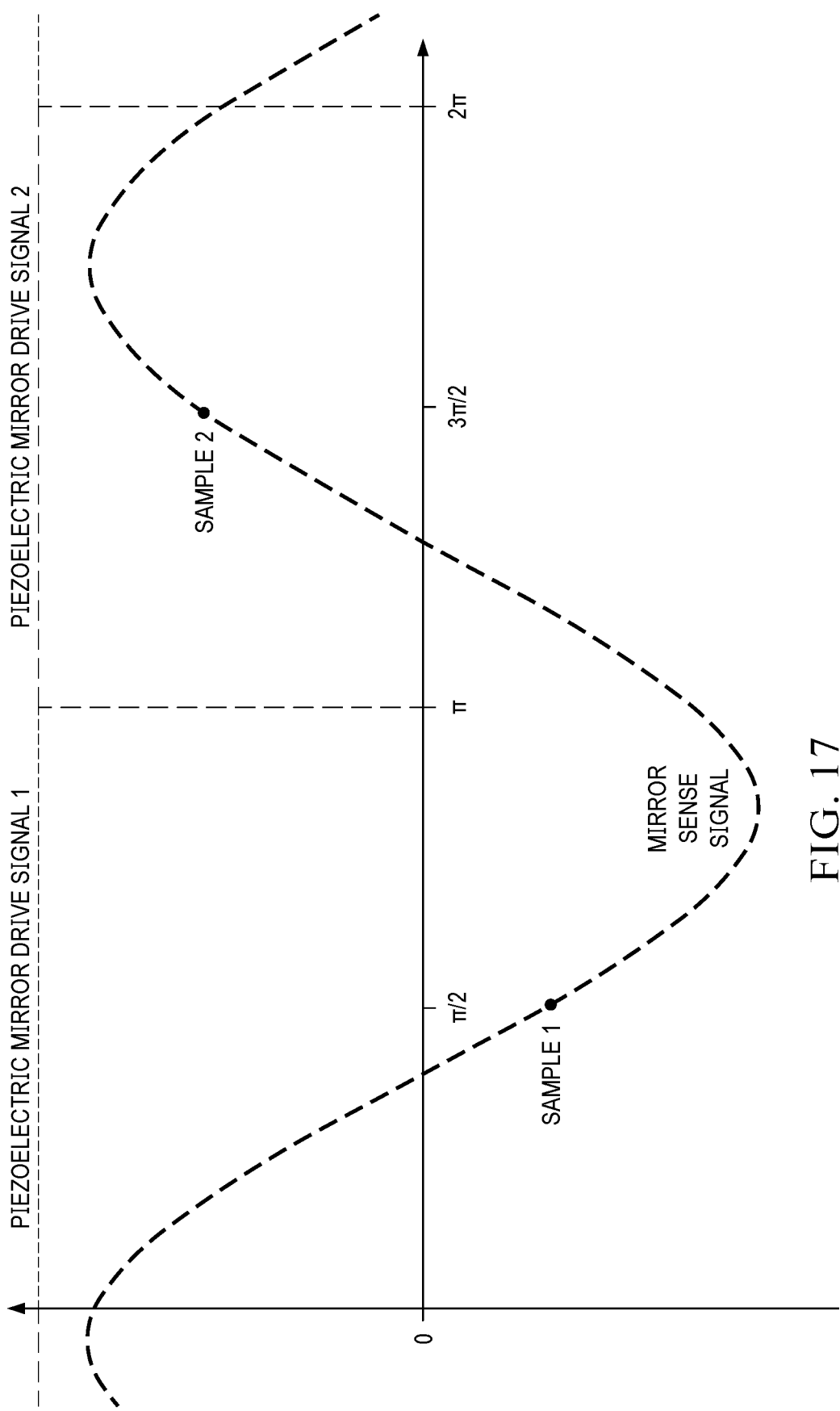
FIG. 17 is a graph showing the mirror drive signal overlaid with the mirror sense signal when using techniques for maintaining the MEMS mirror at its resonance frequency.

Shown in FIG. 17 is a graph of the mirror drive signal 303 overlaid with the mirror sense signal 305. Note that in this example, the mirror drive signal 303 is set up for the MEMS mirror 302 being piezoelectrically operated, and is therefore split into first and second mirror drive signals that are inverse with respect to one another. Here, the first sample of the mirror sense signal 305 is taken when the phase of the mirror drive signal 303 is 90 degrees ($\pi/2$), and the second sample of the mirror sense signal 305 is taken when the phase of the mirror drive signal 302 is 270 degrees ($3\pi/2$).

The ASIC 306 then determines an error as a difference between absolute values of the first and second samples. This can be mathematically represented as Error=|sample 2|−|sample 1|.

Here in FIG. 17, the absolute value of the first sample is less than the absolute value of the second sample, therefore the error value will be positive. This means that the phase difference between the mirror drive signal 303 and the mirror sense signal 305 is less than 90 degrees, indicating that the MEMS mirror 302 is oscillating at above its resonance frequency. Therefore, as a consequence of this error being positive, the ASIC 306 lowers the frequency of the mirror drive signal 303 (by lowering the frequency of the drive control signal 301) until the error is zero, at which point the MEMS mirror 302 will be operating at its resonance frequency.

Figure 18:
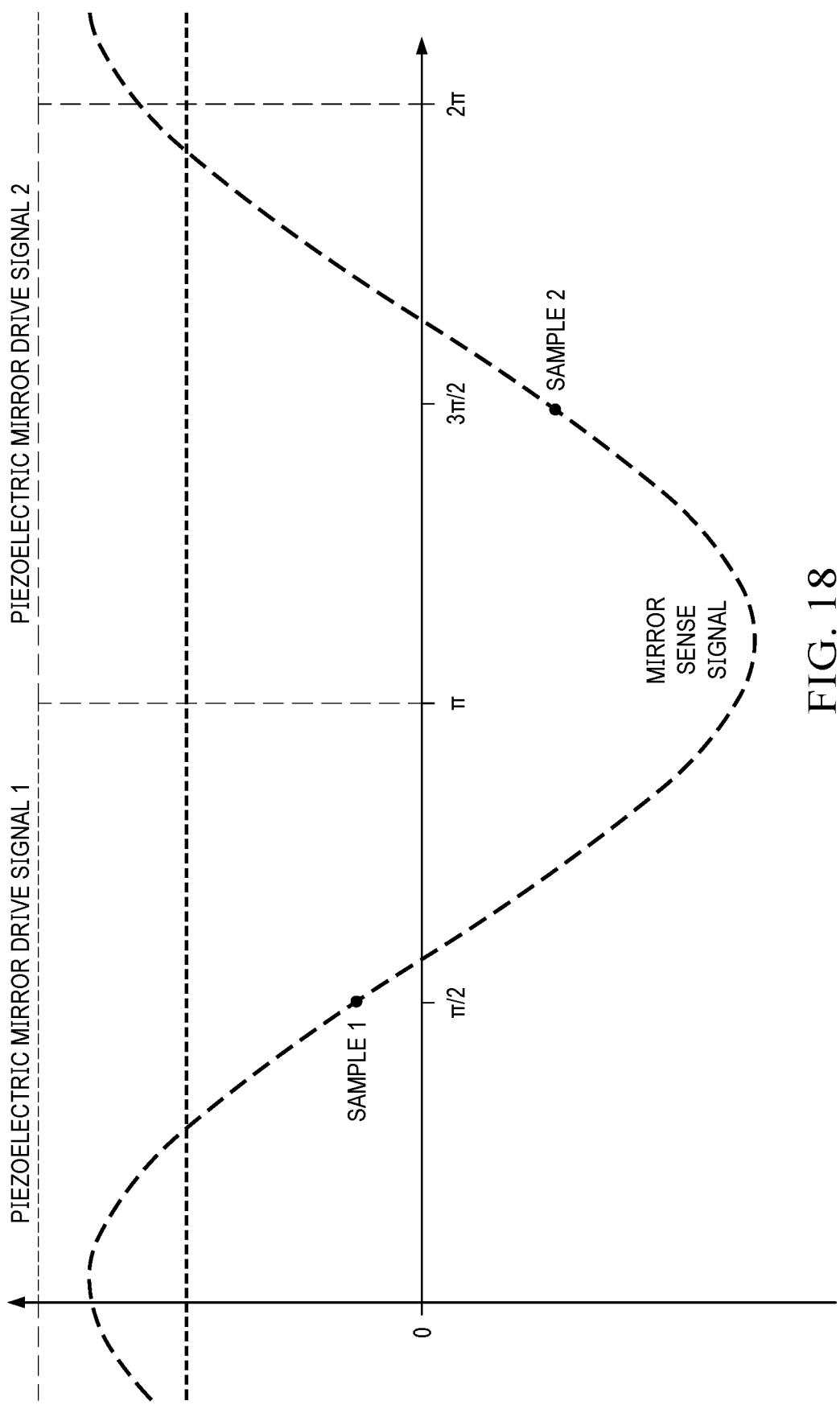
FIG. 18 is a graph showing the mirror drive signal overlaid with the mirror sense signal when using techniques for maintaining the MEMS mirror at its resonance frequency.

Another example is now described. Shown in FIG. 18 is another graph of the mirror drive signal 303 overlaid with the mirror sense signal 305. Note that in this example, the mirror drive signal 303 is also set up for the MEMS mirror 302 being piezoelectrically operated. The first sample of the mirror sense signal 305 is taken when the phase of the mirror drive signal 303 is 90 degrees ($\pi/2$), and the second sample of the mirror sense signal 305 is taken when the phase of the mirror drive signal 302 is 270 degrees ($3\pi/2$). Here, however, the absolute value of the first sample is greater than the absolute value of the second sample, so the error will be negative. This means that the phase difference between the mirror drive signal 303 and the mirror sense signal 305 is greater than 90 degrees, indicating that the MEMS mirror 302 is oscillating at below its resonance frequency. Therefore, as a consequence of this error being negative, the ASIC 306 increases the frequency of the mirror drive signal 303 until the error is zero, at which point the MEMS mirror 302 will be operating at its resonance frequency.

Figure 19:
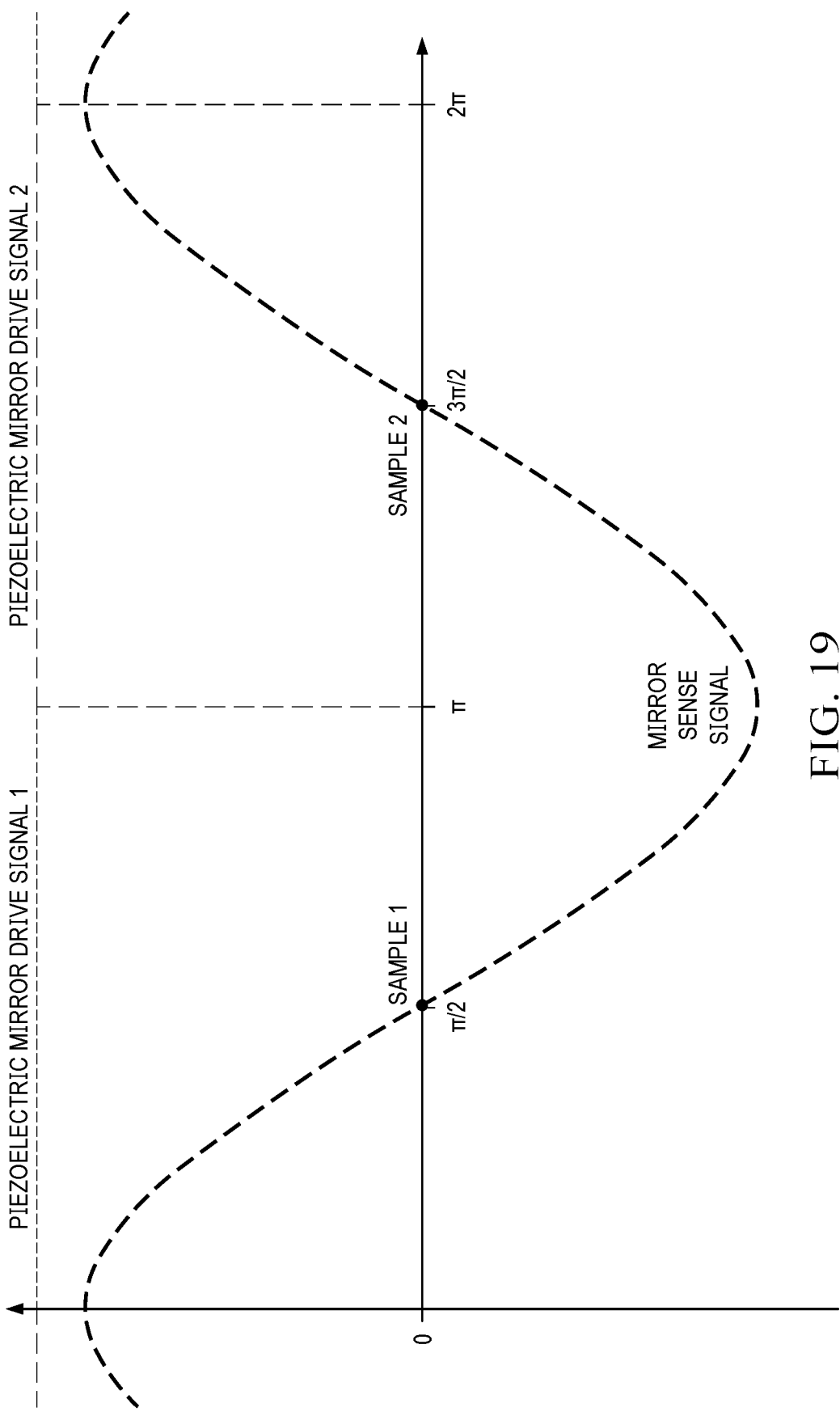
FIG. 19 is a graph showing the mirror drive signal overlaid with the mirror sense signal when using techniques for maintaining the MEMS mirror at its resonance frequency.

A further example is now described. Shown in FIG. 19 is another graph of the mirror drive signal 303 overlaid with the mirror sense signal 305. Note that in this example, the mirror drive signal 303 is also set up for the MEMS mirror 302 being piezoelectrically operated. The first sample of the mirror sense signal 305 is taken when the phase of the mirror drive signal 303 is 90 degrees ($\pi/2$), and the second sample of the mirror sense signal 305 is taken when the phase of the mirror drive signal 302 is 270 degrees ($3\pi/2$). Here, however, the first sample is equal to the second sample, so the error will be zero. This means that the phase difference between the mirror drive signal 303 and the mirror sense signal 305 is 90 degrees, indicating that the MEMS mirror 302 is oscillating at its resonance frequency. Therefore, the ASIC 306 simply maintains the frequency of the mirror drive signal 303.

Figure 20:
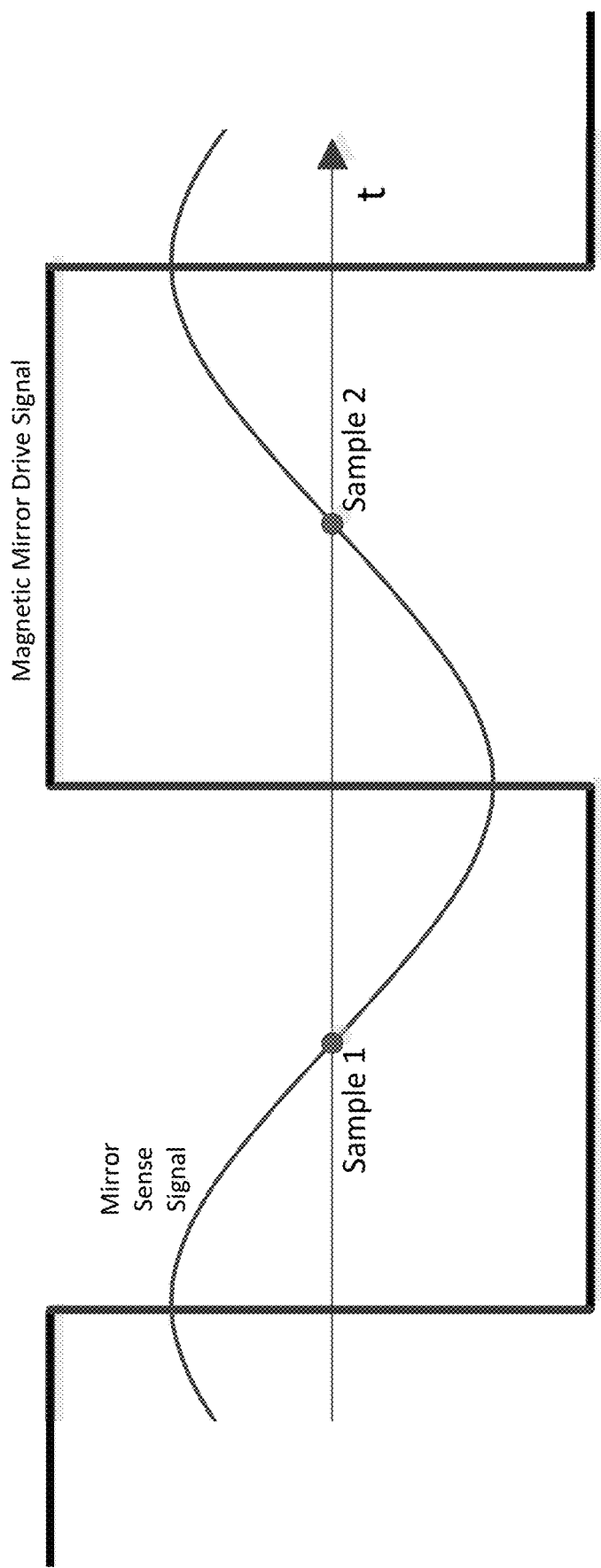
FIG. 20 is a graph showing the mirror drive signal overlaid with the mirror sense signal when using techniques for maintaining the MEMS mirror at its resonance frequency.

Yet another example is now described. Shown in FIG. 20 is a graph of the mirror drive signal 303 overlaid with the mirror sense signal 305. Note that in this example, the mirror drive signal 303 is set up for the MEMS mirror 302 being magnetically operated, and is therefore not split into first and second mirror drive signals like in the previous examples. The first sample of the mirror sense signal 305 is taken when the phase of the mirror drive signal 303 is 90 degrees ($\pi/2$), and the second sample of the mirror sense signal 305 is taken when the phase of the mirror drive signal 302 is 270 degrees ($3\pi/2$). Here, the first sample is equal to the second sample, so the error will be zero. This means that the phase difference between the mirror drive signal 303 and the mirror sense signal 305 is 90 degrees, indicating that the MEMS mirror 302 is oscillating at its resonance frequency. So, the ASIC 306 simply maintains the frequency of the mirror drive signal 303.

It should be understood that the ASIC 306 may use an internal digitizer to digitize the samples of the mirror sense signal 305, or may instead cooperate with an external digitizer to digitize the samples of the mirror sense signal 305. It should also be understood that the functions of the ASIC 306 described above with respect to the control of the MEMS mirror 302 may instead be performed by a microprocessor, microcontroller, or programmable logic array.

Note that while sampling of the mirror sense signal 305 has been described as being performed at 90 degrees and 270 degrees of phase of the mirror drive signal 303, it may instead be performed at any phases of the mirror drive signal 303 which would enable a determination of the phase difference between the mirror drive signal 303 and the mirror sense signal 305. Indeed, the phases may be selected to be 180 degrees apart but not at 90 and 270 degrees, for example being selected to be 88 and 268 degrees, so as to enable operation of the MEMS mirror 302 at close to (but not at) its resonance frequency.

This control loop described above that is based on phase is particularly advantageous because the resonance frequency of the MEMS mirror 302 may change during operation due to temperature or other operating conditions. Therefore, by setting the control loop so as to maintain 90 degrees of phase separation between the mirror drive signal 303 and the mirror sense signal 305, the MEMS mirror 302 will be continually operated at its current resonance frequency as that resonance frequency changes. This control loop is usable with any sort of mirror drive technique, and in some instances, can be fully implemented with discrete electrical components, such as by a programmed logic array or field programmable gate array. Also, this control loop may be used with any of the control techniques described above.

MEMS Resonance Control Using Zero Cross Detection

As a quick summary, a second technique to maintain a MEMS mirror at its resonance frequency involves the determination of zero crosses of the mirror sense signal, the use of the timing of the zero crosses to determine when peaks of the mirror sense signal will occur, and the adjustment of the drive control signal such that the mirror drive signal transitions at the determined peaks.

Figure 21:
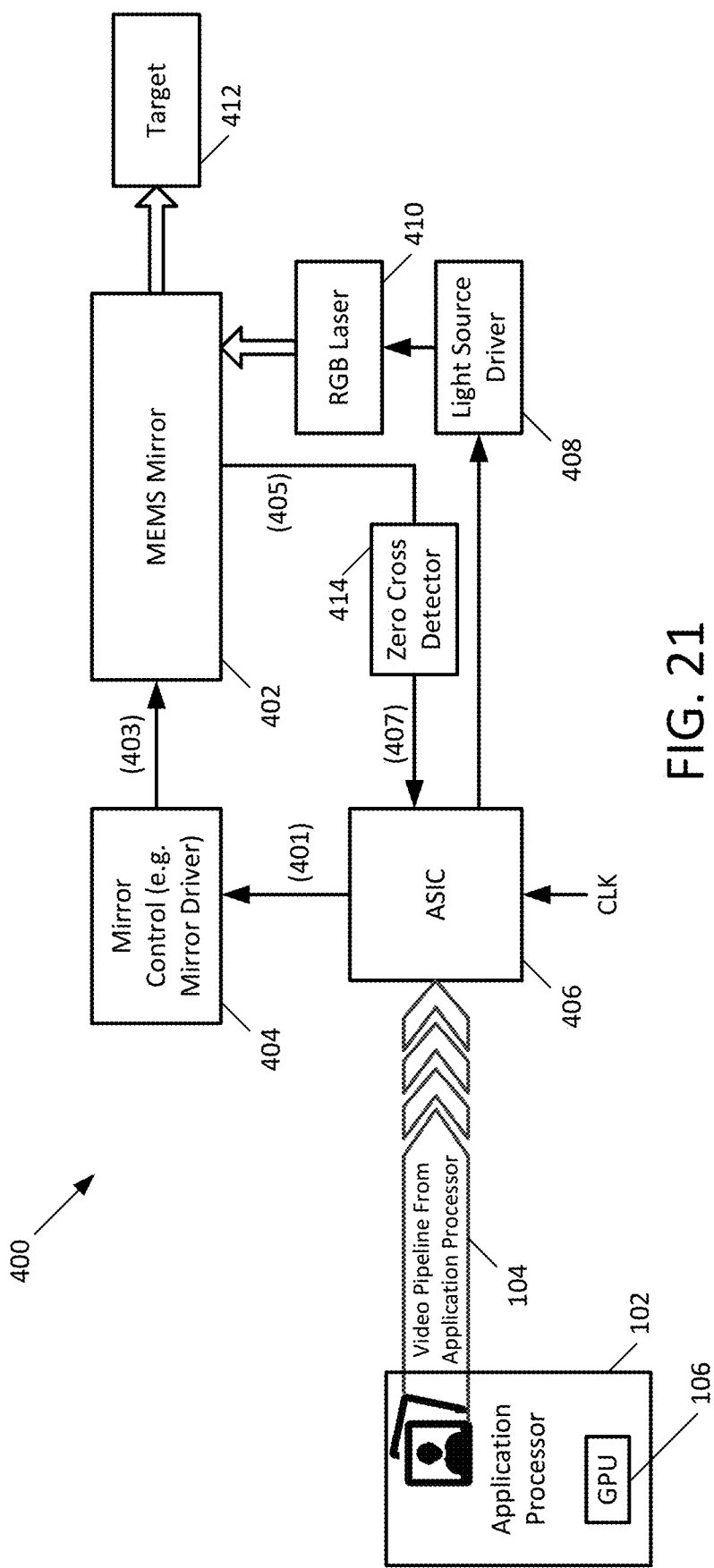
FIG. 21 is a schematic block diagram of another light projection system.

The second technique is now described with reference to FIG. 21. The MEMS mirror control system 400 includes an application specific integrated circuit (ASIC) 406 coupled to a video pipeline 104 from an application processor 102. The ASIC 406 receives a video signal encoded within the video pipeline 104, processes the video signal, and then sends control signals to a light source driver 408 that controls a combined red-green-blue laser 410 (or any beam of light) aimed at a MEMS mirror 402. This MEMS mirror 402 is a resonance mirror that may be piezoelectrically operated or magnetically operated, and may be a uni-axial mirror or a bi-axial mirror.

The ASIC 406 also generates a drive control signal 401 to control a mirror driver 404, which in turn generates a mirror drive signal 403 for the MEMS mirror 402. The MEMS mirror 402 oscillates under control of the mirror drive signal 403, reflecting the RGB laser 410 across the target 412 at a rate sufficient to create a static or moving image when viewed by the human eye. Note that the application processor 102 optionally contains a GPU 106 which may be used for performing some processing on the video pipeline 104, as described extensively above.

The MEMS mirror 402 generates a mirror sense signal 405 as it oscillates under control of the mirror drive signal 403. A zero cross detector 414 (e.g., a suitably configured comparator) is coupled to receive the mirror sense signal 405, and flags a zero cross detection signal 407 when zero crosses of the mirror sense signal 405 are detected.

In order for the MEMS mirror 402 to be oscillating at its resonance frequency, the mirror drive signal 403 should transition at the maximum (positive and negative) opening angles of the MEMS mirror 402. Out of a desire for device simplification and speed, the Inventors have found it possible to accurately estimate when these maximum opening angles occur.

Figure 22:
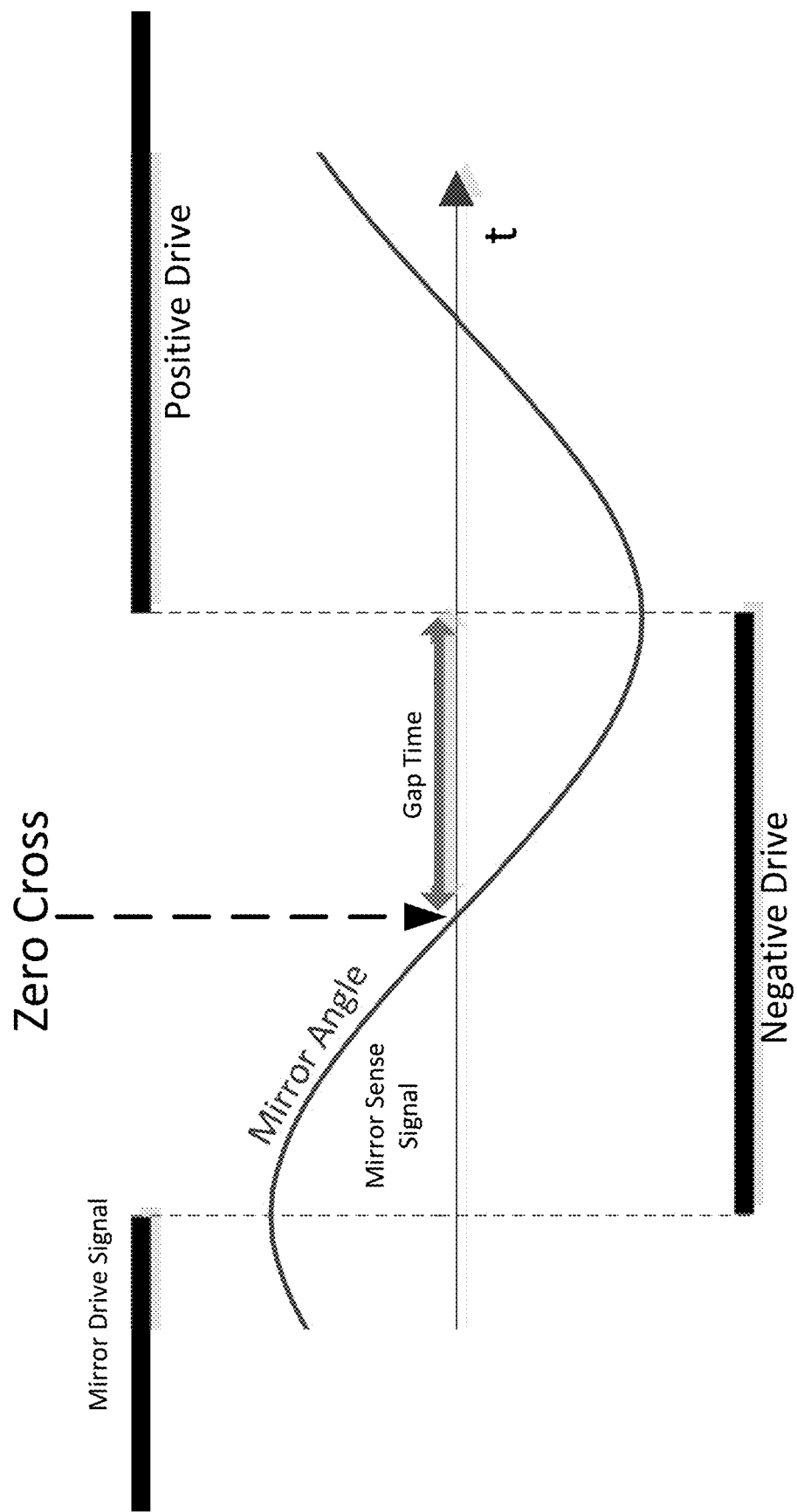
FIG. 22 is a graph showing the mirror drive signal overlaid with the mirror sense signal when using techniques for maintaining the MEMS mirror at its resonance frequency.

To perform this estimation, the zero cross detector 414, as stated, flags (asserts) the zero cross detection signal 407 when zero crosses of the mirror sense signal are detected. The ASIC 406 measures the elapsed time between successive flags of the zero cross detection signal 407. Shown in FIG. 22 is a graph of the mirror drive signal 403 overlaid with the mirror sense signal 405 (which also indicates the opening angle of the MEMS mirror), and it can be seen that the zero crossing occurs equidistantly between a positive peak and a negative peak of the mirror sense signal 405. Therefore, the ASIC 406 sets a "gap" time as being equal to one half the measured elapsed time between successive flags of the zero cross detection signal 407, and estimates the maximum opening angles of the MEMS mirror 402 (peaks of the mirror sense signal 405) to occur the gap time after each zero cross. Then, the ASIC 406 adjust the mirror drive signal 403 so that the mirror drive signal 403 transitions at each peak of the mirror sense signal 405 (e.g. each occurrence of a maximum opening angle of the MEMS mirror 402). When the mirror drive signal 403 transitions at the peaks of the mirror sense signal 405, the MEMS mirror 402 is oscillating at its resonance frequency. Therefore, by continually updating the gap time based on the zero cross flag timings, the ASIC 406 maintains the MEMS mirror 402 oscillating at its resonance frequency over time, even if the resonance frequency changes due to operating conditions.

This operation can be clearly seen in FIG. 22. Here, it can be clearly seen that the mirror drive signal 403 is set to transition at the peaks of the mirror sense signal 405, and that these peaks occur at an interval of the gap time from the zero crossing.

One way in which the ASIC 402 can count the elapsed time between two successive flags of the zero cross detection signal 407 is to count the number of clock signal (CLK) cycles between the successive flags. Therefore, to determine the gap, the ASIC 402 simply divides the result in half, since the result will be an even number. So, the ASIC 402 can determine that the gap is 10 clock cycles as an example, and can estimate the peaks of the mirror sense signal 405 to occur 10 clock cycles after each zero crossing.

Note that any delay in processing (e.g., any delay from the time the zero crossing actually occurs to the time when the gap is calculated) can be compensated by simply adjusting the gap to account for the delay.

Figure 23:
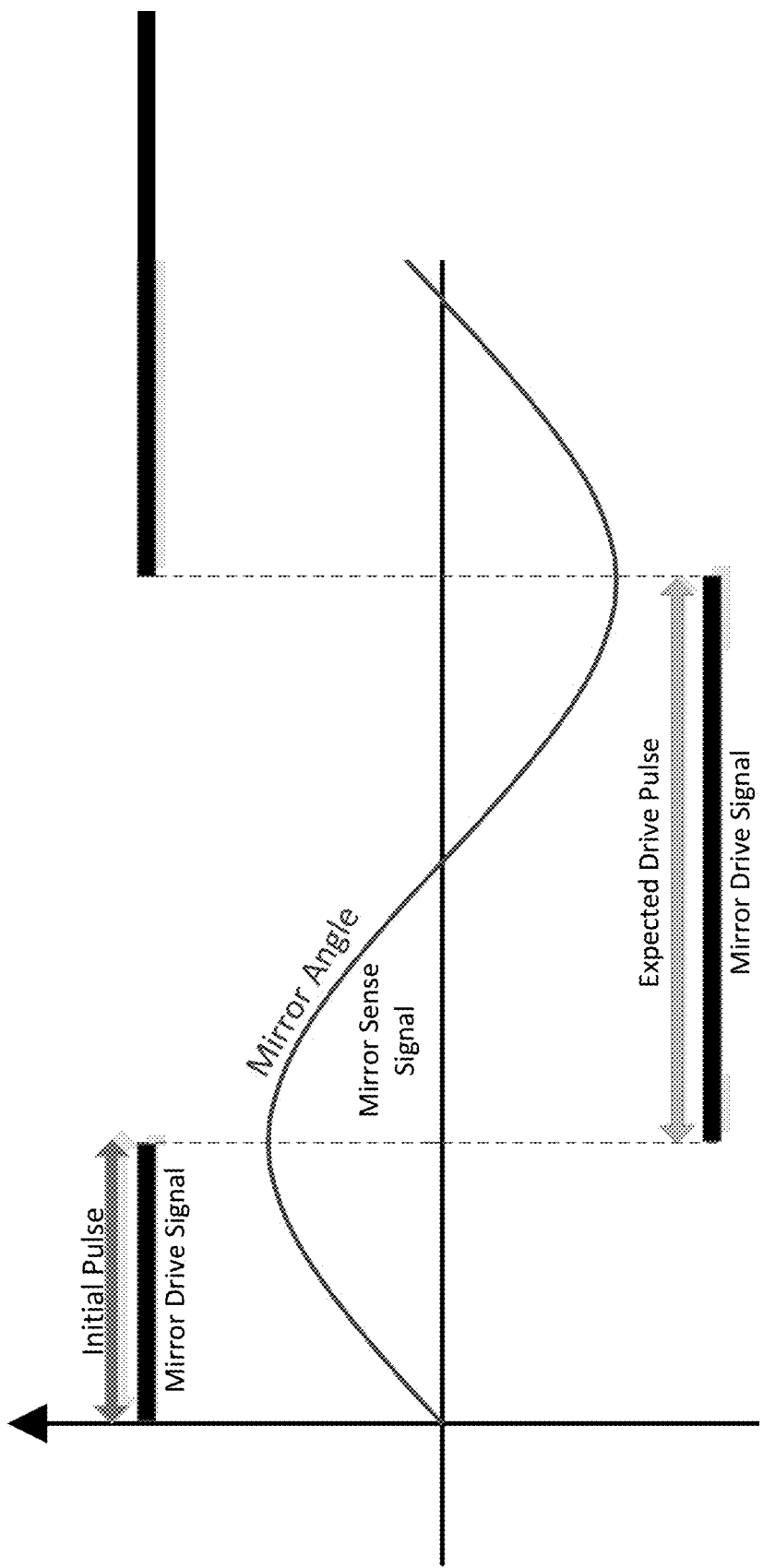
FIG. 23 is a graph showing the mirror drive signal overlaid with the mirror sense signal when using techniques for maintaining the MEMS mirror at its resonance frequency.

Initially (upon device powerup, for example), the ASIC 406 generates the drive control signal 401, and thus the mirror drive signal 403, so as to have a pulse length equal to half an expected pulse length for the mirror drive signal 403. The expected pulse length is set such that transitions of the mirror drive signal 403 occur when peaks of the mirror sense signal 405 are expected to occur. This can be clearly seen in FIG. 23, where the initial pulse of the mirror drive signal 403 is one half of the expected pulse.

Explained a different way, initially, the zero cross detection signal 407 is asserted upon powerup, and the gap is set to be equal to one half to the expected elapsed time between expected zero crossings.

Then, the ASIC 402 proceeds as described above with updating the gap at each successive flag of the zero cross detection signal 407 to be equal to one half the time that elapsed between the current flag of the zero cross detection signal 407 and the prior flag of the zero cross detection signal 407.

Figure 24:
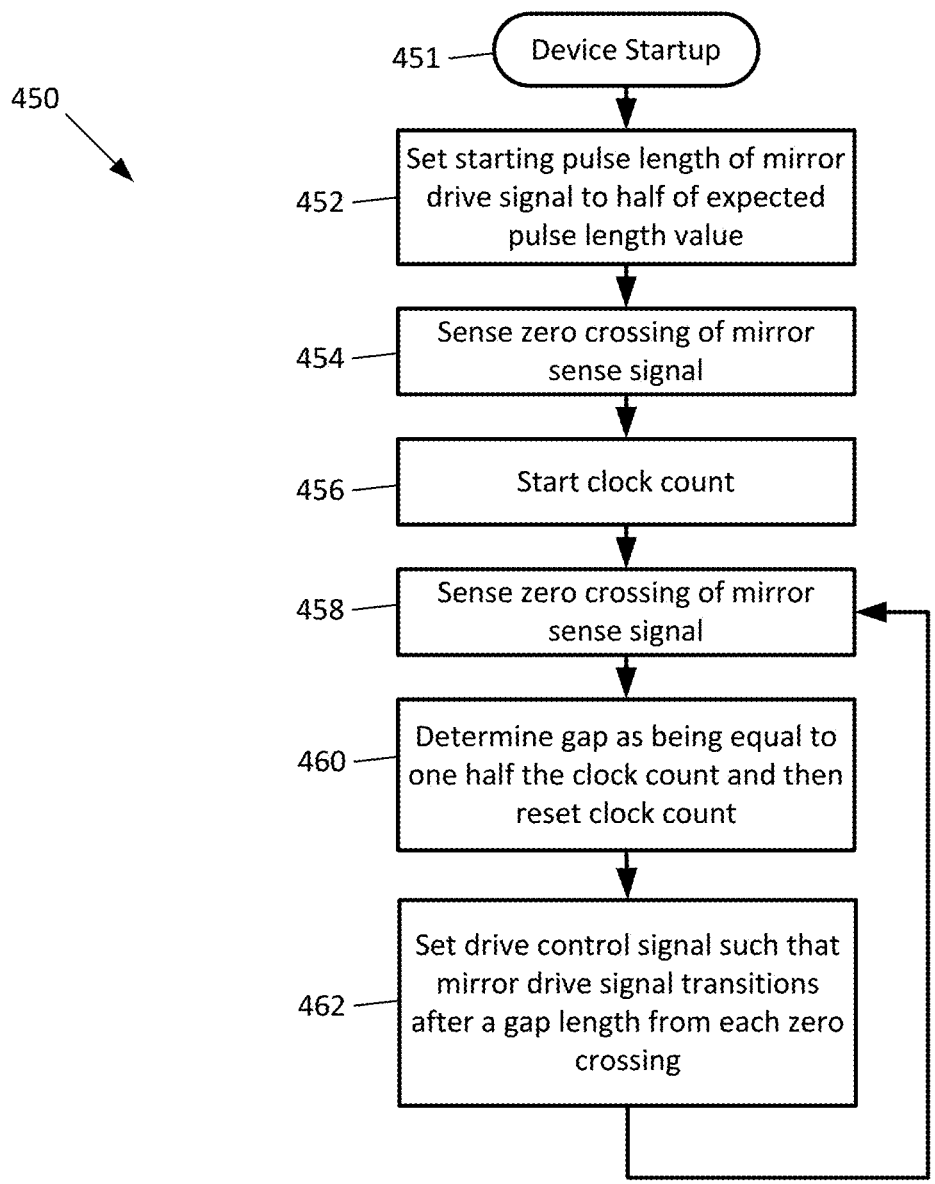
FIG. 24 is a flowchart illustrating control techniques performed by the light projection system of FIG. 12.

The control loop described above can quickly summed up with reference to the flowchart 450 of FIG. 24. Here, after device startup (block 451), the starting pulse length of the mirror drive signal is set to half the expected pulse length as described above (block 452). Then, the next zero crossing of the mirror sense signal is sensed (block 454), and the clock counting described above begins (block 456). Then, upon a next sensed zero crossing of the mirror sense signal (block 458), the gap is determined as being equal to one half the clock count, the clock count is reset (block 460), and the drive control signal is set such that the mirror drive signal transitions after a gap length from each zero crossing of the mirror sense signal (block 462).

This control loop described above that is based on zero crossing detection is particularly advantageous because the resonance frequency of the MEMS mirror 402 may change during operation due to temperature or other operating conditions, yet the MEMS mirror 402 is maintained at its resonance frequency as that resonance frequency changes. In addition, another advantage provided is that the mirror sense signal 405 does not need to be sampled, so latency is low. Due to this low latency, the response to the resonance frequency changing is very quick, maintaining the MEMS mirror 402 at the resonance frequency.

This control loop is usable with any sort of mirror drive technique, and in some instances, can be fully implemented with discrete electrical components, such as by a programmed logic array or field programmable gate array. Also, this control loop may be used with any of the control techniques described above. In addition, note that instead of the ASIC 406, a generic microprocessor, processor, controller, or system on a chip may be used for the counting of the clock cycles and the generation of the drive control signal.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:
1. A light projection system, comprising:
a microelectromechanical (MEMS) mirror configured to operate in response to a mirror drive signal and to generate a mirror sense signal as a result of the operation of the MEMS mirror in response to the mirror drive signal;

a mirror driver configured to generate the mirror drive signal in response to a drive control signal; and a controller configured to, during each period of the mirror drive signal:
  a) receive the mirror sense signal from the MEMS mirror;
  b) obtain a first sample of the mirror sense signal at a first phase of the mirror drive signal, the first sample of the mirror sense signal being a first sample of the mirror sense signal taken during a current period of the mirror drive signal;
  c) obtain a second sample of the mirror sense signal at a second phase of the mirror drive signal, wherein the first and second phases are separated by a half period of the mirror drive signal, with the second phase occurring after the first phase, wherein the second sample of the mirror sense signal is a next sample of the mirror sense signal taken after the first sample of the mirror sense signal during the current period of the mirror drive signal, and wherein the second sample of the mirror sense signal is a last sample of the mirror sense signal taken during the current period of the mirror drive signal; and
  d) generate the drive control signal as a function of a difference between the first and second samples so as to keep the mirror drive signal separated in phase from the mirror sense signal by a desired amount of phase separation.

2. The light projection system of claim 1, wherein the desired amount of phase separation is 90 degrees.

3. The light projection system of claim 1, wherein the first phase is 90 degrees and the second phase is 270 degrees.

4. The light projection system of claim 1, wherein the desired amount of phase separation is a phase separation at which the MEMS mirror is operating at its resonance frequency.

5. The light projection system of claim 1, wherein the desired amount of phase separation is a phase separation at which the first and second samples are equal.

6. The light projection system of claim 1, wherein the first sample being less than the second sample indicates that the phase separation between the mirror drive signal and mirror sense signal is less than 90 degrees; and wherein the mirror generates the drive control signal so as to increase the phase separation to 90 degrees.

7. The light projection system of claim 1, wherein the first sample being greater than the second sample indicates that the phase separation between the mirror drive signal and mirror sense signal is greater than 90 degrees; and wherein the mirror generates the drive control signal so as to decrease the phase separation to 90 degrees.

8. The light projection system of claim 1, wherein the controller is configured to, in an initial setup mode, generate the drive control signal so that the mirror drive signal is expected to be separated in phase from the mirror sense signal by the desired amount, and thereafter, in a normal operation mode, perform a), b), c), and d).

9. A light projection system, comprising:
a microelectromechanical (MEMS) mirror configured to operate based on a mirror drive signal and to generate a mirror sense signal as a result of the operation of the MEMS mirror based upon the mirror drive signal;
a mirror driver configured to generate the mirror drive signal in response to a drive control signal; and
a controller configured to, during each period of the mirror drive signal:
  a) receive the mirror sense signal from the MEMS mirror;
  b) obtain first and second samples of the mirror sense signal at times separated by a half period of the mirror drive signal, the first sample of the mirror sense signal being a first sample of the mirror sense signal taken during a current period of the mirror drive signal, wherein the second sample of the mirror sense signal is a next sample of the mirror sense signal taken after the first sample of the mirror sense signal during the current period of the mirror drive signal, and wherein the second sample of the mirror sense signal is a last sample of the mirror sense signal taken during the current period of the mirror drive signal; and
  c) generate the drive control signal such the first and second samples are equal.

10. The light projection system of claim 9, wherein the controller obtains the first and second samples at phases of the mirror drive signal at which the first and second samples would be expected to be equal, and the controller generates the drive control signal such that the first and second samples are actually equal.

11. The light projection system of claim 9, wherein the first and second samples being equal indicates that the mirror drive signal and the mirror sense signal are separated in phase by a desired amount.

12. The light projection system of claim 9, wherein the first and second samples being equal indicates that the MEMS mirror is operating at its resonance frequency.

13. The light projection system of claim 9, wherein the controller is configured to, in an initial setup mode, generate the drive control signal so that the first and second samples will be expected to be equal, and thereafter, in a normal operation mode, perform a), b), and c) so that the first and second samples are actually equal.

14. A method, comprising steps of:
  a) generating a mirror drive signal in response to a drive control signal and applying the mirror drive signal to a microelectromechanical (MEMS) mirror to drive oscillation of that mirror;
  b) during each period of the mirror drive signal, sampling a mirror sense signal produced by the MEMS mirror twice at times separated by a half period of the mirror drive signal to produce first and second samples, the first sample being sampled when the mirror drive signal is at a first phase and being a first sample of the mirror sense signal taken during a current period of the mirror drive signal, the second sample being sampled when the mirror drive signal is at a second phase that occurs subsequent to the first phase by half a period of the mirror drive signal and being a next sample of the mirror sense signal taken during a current period of the mirror drive signal as well as a last sample of the mirror sense signal taken during the current period of the mirror drive signal;
  c) determining a difference between the first and second samples;
  d) adjusting the drive control signal based upon the difference, if the difference is other than zero; and
  e) returning to step a).

15. The method of claim 14, wherein the adjustment of the drive control signal serves to adjust a phase of the mirror drive signal so as to be separated from that of the mirror sense signal by 90 degrees, thereby operating the MEMS mirror at its resonance frequency.

16. The method of claim 14, wherein the adjustment of the drive control signal serves to adjust phase of the mirror drive signal so as to be separated from that of the mirror sense signal by a desired phase difference, thereby operating the MEMS near its resonance frequency.

17. The method of claim 14, wherein the first phase is 90 degrees and the second phase is 270 degrees.

18. The method of claim 14, wherein the first sample being less than the second sample results in the adjustment of the drive control signal at step d) such that a frequency of the mirror drive signal decreases.

19. The method of claim 14, wherein the first sample being greater than the second sample results in the adjustment of the drive control signal at step d) such that a frequency of the mirror drive signal increases.

20. The method of claim 14, wherein the adjustment of the drive control signal is expected to cause the mirror drive signal to be separated from the mirror sense signal by 90 degrees of phase.

21. The method of claim 14, wherein the drive control signal after adjustment is expected to result in the mirror drive signal operating the MEMS mirror near or at its resonance frequency.

22. A light projection system, comprising:
   a microelectromechanical (MEMS) mirror configured to operate in response to a mirror drive signal and to generate a mirror sense signal as a result of the operation of the MEMS mirror in response to the mirror drive signal;
   a laser configured to emit a laser beam directed at the MEMS mirror so that the MEMS mirror reflects the laser beam across a target surface in a scan pattern;
   a mirror driver configured to generate the mirror drive signal in response to a drive control signal; and
   a controller configured to, during each period of the mirror drive signal:
      a) receive the mirror sense signal from the MEMS mirror;
      b) obtain a first sample of the mirror sense signal at a first phase of the mirror drive signal, the first sample of the mirror sense signal being a first sample of the mirror sense signal taken during a current period of the mirror drive signal;
      c) obtain a second sample of the mirror sense signal at a second phase of the mirror drive signal, wherein the first and second phases are separated by a half period of the mirror drive signal, with the second phase occurring after the first phase, wherein the second sample of the mirror sense signal is a next sample of the mirror sense signal taken after the first sample of the mirror sense signal during the current period of the mirror drive signal, and wherein the second sample of the mirror sense signal is a last sample of the mirror sense signal taken during the current period of the mirror drive signal; and
      d) generate the drive control signal based upon the first and second samples so as to keep the mirror drive signal separated in phase from the mirror sense signal by a desired amount of phase separation.

23. The light projection system of claim 22, wherein the controller is configured to, in an initial setup mode, generate the drive control signal so that the mirror drive signal is expected to be separated in phase from the mirror sense signal by the desired amount, and thereafter, in a normal operation mode, perform a), b), c), and d).

24. The light projection system of claim 22, wherein the desired amount of phase separation is 90 degrees.

25. The light projection system of claim 22, wherein the first phase is 90 degrees and the second phase is 270 degrees.

26. The light projection system of claim 22, wherein the desired amount of phase separation is a phase separation at which the MEMS mirror is operating at its resonance frequency.

27. The light projection system of claim 22, wherein the desired amount of phase separation is a phase separation at which the first and second samples are equal.

28. The light projection system of claim 22, wherein the first sample being less than the second sample indicates that the phase separation between the mirror drive signal and mirror sense signal is less than 90 degrees; and wherein the mirror generates the drive control signal so as to increase the phase separation to 90 degrees.

29. The light projection system of claim 22, wherein the first sample being greater than the second sample indicates that the phase separation between the mirror drive signal and mirror sense signal is greater than 90 degrees; and wherein the mirror generates the drive control signal so as to decrease the phase separation to 90 degrees.

30. The light projection system of claim 22, further comprising:
   a processing unit configured to:
      receive video data containing video images for display; and
   a laser driver configured to control the laser as a function of the video data such that the video images are displayed on the target surface.

* * * * *